US012442246B2

(12) United States Patent
Godwin et al.

(10) Patent No.: US 12,442,246 B2
(45) Date of Patent: Oct. 14, 2025

(54) PET TRAVEL DOOR AND ASSOCIATED METHODS

(71) Applicant: In & Out Products LLC, The Villages, FL (US)

(72) Inventors: Jesse Godwin, The Villages, FL (US); Ernest Donald Bame, Mullins, SC (US); Kelvin Brad Caulder, Lakeview, SC (US)

(73) Assignee: In & Out Products LLC, The Villages, FL (US)

( * ) Notice: Subject to any disclaimer, the term of this patent is extended or adjusted under 35 U.S.C. 154(b) by 73 days.

(21) Appl. No.: 18/478,004

(22) Filed: Sep. 29, 2023

(65) Prior Publication Data

US 2024/0026734 A1 Jan. 25, 2024

Related U.S. Application Data

(63) Continuation of application No. 18/055,885, filed on Nov. 16, 2022, now Pat. No. 11,859,442, which is a continuation-in-part of application No. 17/667,887, filed on Feb. 9, 2022, now Pat. No. 11,530,571.

(51) Int. Cl.

| | |
|---|---|
| ***E06B 7/32*** | (2006.01) |
| ***E06B 7/23*** | (2006.01) |
| ***E06B 9/02*** | (2006.01) |

(52) U.S. Cl.

CPC .............. *E06B 7/32* (2013.01); *E06B 7/2314* (2013.01); *E06B 9/02* (2013.01)

(58) Field of Classification Search

CPC . E06B 7/32; E06B 7/2314; E06B 5/11; E06B 9/04; E06B 9/02

See application file for complete search history.

(56) References Cited

U.S. PATENT DOCUMENTS

| | | | | | |
|---|---|---|---|---|---|
| 2,576,348 | A * | 11/1951 | Kinghorn | E06B 3/28 | 52/656.6 |
| 2,758,646 | A * | 8/1956 | Johnson | E06B 7/32 | 160/90 |
| 4,408,416 | A * | 10/1983 | Davlantes | E06B 7/32 | 160/90 |
| 4,754,797 | A * | 7/1988 | Sronce | E06B 7/32 | 160/354 |
| 5,269,097 | A * | 12/1993 | Davlantes | E05C 9/00 | 49/169 |
| 5,289,655 | A * | 3/1994 | Marmora | E06B 9/04 | 49/141 |
| 5,406,748 | A * | 4/1995 | Davlantes | E06B 7/32 | 49/245 |

(Continued)

*Primary Examiner* — Justin B Rephann

(74) *Attorney, Agent, or Firm* — Widerman Malek, PL; Mark Malek; Jonathan Staudt

(57) ABSTRACT

A pet travel door that may include a pet travel door frame, a seal, a flap, and one or more of a security panel. The pet travel door may be installable in a surface and may allow for selectable passage of animals. The pet travel door frame may have an interior perimeter. The seal may be connected to a portion of the inner perimeter of the pet travel door frame. The flap may be pivotally connected to an upper portion of the interior perimeter of the pet travel door frame. The one or more security panels may be attachable to the pet travel door frame and may be selectively moveable between a closed position and an opened position.

14 Claims, 27 Drawing Sheets

(56) References Cited

U.S. PATENT DOCUMENTS

| | | | | | |
|---|---|---|---|---|---|
| 5,581,940 | A * | 12/1996 | Peterson | E06B 7/32 49/386 |
| 5,657,592 | A * | 8/1997 | Davlantes | E06B 7/32 49/168 |
| 5,735,079 | A * | 4/1998 | Davlantes | E06B 7/32 49/504 |
| 5,946,856 | A * | 9/1999 | Davlantes | E06B 7/32 49/168 |
| 5,992,096 | A * | 11/1999 | De La Cerda | E05F 15/76 160/180 |
| 6,481,158 | B1 * | 11/2002 | Marks | E05B 65/1033 49/141 |
| 6,681,524 | B1 * | 1/2004 | Tillson | E06B 7/32 160/180 |
| 6,725,806 | B1 * | 4/2004 | Gribble | E06B 7/32 119/484 |
| 6,745,515 | B1 * | 6/2004 | Chen | E05B 65/10 160/180 |
| 6,786,005 | B1 * | 9/2004 | Williams | E05B 65/1033 49/141 |
| 6,959,511 | B2 * | 11/2005 | Johnson | E06B 7/32 160/180 |
| 7,913,454 | B2 * | 3/2011 | Sullivan | E06B 7/32 160/180 |
| 7,984,695 | B1 * | 7/2011 | Shaffer | E06B 7/32 119/501 |
| 8,434,264 | B2 * | 5/2013 | Bosserdet, Jr. | E06B 7/32 49/168 |
| 8,484,896 | B1 * | 7/2013 | Skubiak, Jr. | E06B 7/32 160/369 |
| 8,826,594 | B2 * | 9/2014 | Graves | E05B 47/0012 49/169 |
| 9,200,481 | B2 * | 12/2015 | Walther | E06B 1/52 |
| 10,619,389 | B2 * | 4/2020 | Mainini | E06B 7/32 |
| 10,667,490 | B2 * | 6/2020 | Volin | E05B 1/0053 |
| 10,920,484 | B2 * | 2/2021 | Miller | E05F 15/611 |
| 11,384,595 | B1 * | 7/2022 | Harrington | E06B 1/526 |
| 11,530,571 | B1 * | 12/2022 | Godwin | E06B 7/32 |
| 11,702,885 | B1 * | 7/2023 | Harrington | A01K 29/00 49/31 |
| 12,060,743 | B2 * | 8/2024 | Miller | A01K 29/00 |
| 2006/0156512 | A1 * | 7/2006 | Naylor | E05D 5/128 16/273 |
| 2009/0049753 | A1 * | 2/2009 | Lomax | E06B 7/32 49/478.1 |
| 2009/0260294 | A1 * | 10/2009 | Sullivan | E06B 7/32 49/394 |
| 2011/0219695 | A1 * | 9/2011 | Ivasiv | E05D 11/00 49/394 |
| 2011/0220302 | A1 * | 9/2011 | Lomax | E06B 7/32 160/104 |
| 2013/0305609 | A1 * | 11/2013 | Graves | E05B 47/02 49/31 |
| 2014/0033639 | A1 * | 2/2014 | Walther | E06B 1/52 52/745.16 |
| 2018/0195326 | A1 * | 7/2018 | Mainini | E06B 1/52 |
| 2019/0234138 | A1 * | 8/2019 | Zacher | E06B 7/32 |
| 2019/0345758 | A1 * | 11/2019 | Drost | E06B 7/32 |
| 2019/0390509 | A1 * | 12/2019 | Chatterton | E06B 9/32 |
| 2020/0347669 | A1 * | 11/2020 | Nickerson | E06B 7/32 |
| 2020/0408035 | A1 * | 12/2020 | Miller | E05F 15/611 |
| 2021/0079720 | A1 * | 3/2021 | Hunt | E06B 7/28 |
| 2021/0123287 | A1 * | 4/2021 | Miller | E06B 7/32 |
| 2021/0180376 | A1 * | 6/2021 | Veronika | E06B 7/32 |
| 2021/0404247 | A1 * | 12/2021 | Schwartz | E05C 19/08 |

* cited by examiner

PET TRAVEL DOOR AND ASSOCIATED METHODS

RELATED APPLICATIONS

This application is a continuation application of and claims priority under 35 U.S.C. § 120 of U.S. patent application Ser. No. 18/055,885 filed on Nov. 16, 2022 and titled A DOOR HAVING AN INTEGRATED PET TRAVEL DOOR, A DOOR PANEL HAVING AN INTEGRATED PET TRAVEL DOOR, AND A KIT TO RETROFIT AN EXISTING DOOR, which in turn is a continuation-in-part application of and claims priority under 35 U.S.C. § 120 of U.S. patent application Ser. No. 17/667,887, now U.S. Pat. No. 11,530,571 issued Dec. 20, 2022 filed on Feb. 9, 2022 and titled PET TRAVEL DOOR SYSTEM. The contents of these applications are incorporated herein by reference except to an extent where the content therein conflicts with the content herein.

FIELD OF THE INVENTION

The present invention relates to systems for easily installed secure pet doors with a security panel to prevent unwanted entry along with sealing the pet door from extreme weather conditions and withstanding impacts from airborne objects.

BACKGROUND OF THE INVENTION

In areas that are subject to extreme weather conditions there is a need for a pet door that has the functionality to be sealed closed to prevent the weather from passing through the pet door which includes a seal that reduces and prevents wind, water, ice, and flying objects from passing through the pet door. There is also a need in areas subject to chances of unwanted entries to be able to seal the pet door shut in order to mitigate the chances of an unwanted entry taking place through the pet door.

The prior art does not address these problems effectively and only address the problems of providing security against unwanted entries and preventing only mild to moderate weather conditions from getting past the pet door. The structure and anchoring of the prior art is lacking the ability to prevent extreme weather conditions and airborne object impacts at high speeds from entering through the pet door. The prior art also does not address the above issues to the degree of achieving relevant structural and impact ratings for hurricane sever weather conditions along with mitigating unwanted entries by intruders. Therefore, there is a need for a pet door which can be easily installed and sealed shut to prevent unwanted entries, extreme weather conditions, and flying objects from entering through the pet door that is also up to standard for relevant structural and impact ratings for hurricane sever weather conditions to provide for increased safety and security of users.

This background information is provided to reveal information believed by the applicant to be of possible relevance to the present invention. No admission is necessarily intended, nor should be construed, that any of the preceding information constitutes prior art against the present invention

SUMMARY OF THE INVENTION

With the above in mind, embodiments of the present invention are related to a pet travel door. The pet travel door may be installable in a surface and may allow for selectable passage of animals. The pet travel door may include a pet travel door frame, a seal, a flap, and one or more of a security panel. The pet travel door frame may have an interior perimeter. The seal may be connected to a portion of the inner perimeter of the pet travel door frame. The flap may be pivotally connected to an upper portion of the interior perimeter of the pet travel door frame. The one or more security panels may be attachable to the pet travel door frame and may be selectively moveable between a closed position and an opened position.

The pet travel door frame may include an interior face and an exterior face. The interior face may be defined as a face of the pet travel door frame that is aligned with an interior portion of a structure when the pet travel door frame is installed in an opening of a door. The exterior face may be defined as a face of the pet travel door frame that is aligned with an exterior portion of the structure when the pet travel door frame is installed in an opening of the door.

The flap may pivot relative to the upper portion of the interior perimeter so that a lower portion of the flap may be moveable between the interior portion of the structure and the exterior portion of the structure. In some embodiments of the present invention, an external perimeter portion of the flap includes flap reinforcement members. The seal may comprise a bumper seal that may extend outwardly from the pet travel door frame.

The closed position of the one or more security panels may be defined as the security panel(s) being substantially contained within the interior perimeter of the pet travel door frame so that the flap may be covered by the security panel. The opened position of the one or more security panels may be defined as the security panel(s) being positioned so that the flap may be partially exposed. The security panel(s) may be is hingedly attachable to the pet travel door frame by one or more detachable hinges that may comprise two hinge portions that may be selectively hingedly engageable with one another. One of the two hinge portions of the detachable hinge(s) may be attached to the pet travel door frame and the other may be attached to one of the security panel(s).

In some embodiments of the present invention, a lock may be carried by the one or more security panel(s) and may be selectively moveable between a locked position and an unlocked position. The locked position of the lock may be defined by a locking arm of the lock being engaged with a lock slot that may be formed in a portion of the pet travel door frame. The unlocked position of the lock may be defined by the locking arm being positioned to disengage the lock slot. In some embodiments of the present invention, the lock slot may be angled with respect to the pet travel door frame.

The flap may be moveable between an opened position and a closed position when the security panel is in the opened position. The closed position of the flap may be defined as a bottom portion of the flap being substantially aligned with a bottom portion of the pet travel door frame. The opened position of the flap may be defined as the bottom portion of the flap being at least partially spaced apart from the bottom portion of the pet travel door frame. The seal may abut an outer perimeter of the flap when the flap is in the closed position. In some embodiments of the present invention, the pet travel door frame may be integrated into a door panel. The pet travel door frame may mounted on a perimeter of a passageway that may be formed through the door panel.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 3:
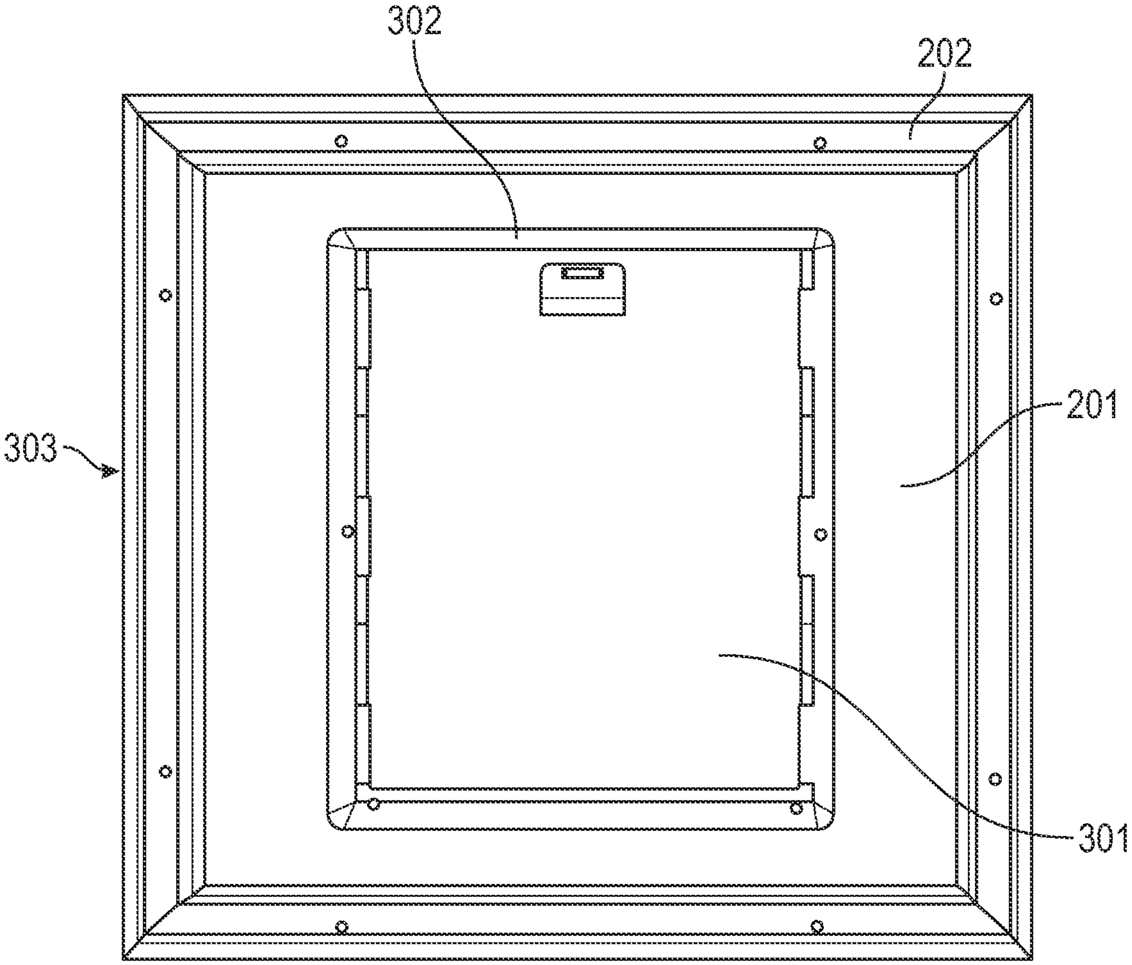
FIG. 3 is a perspective view of the door panel illustrated in FIG. 2 being separated from the door.
Figure 4:
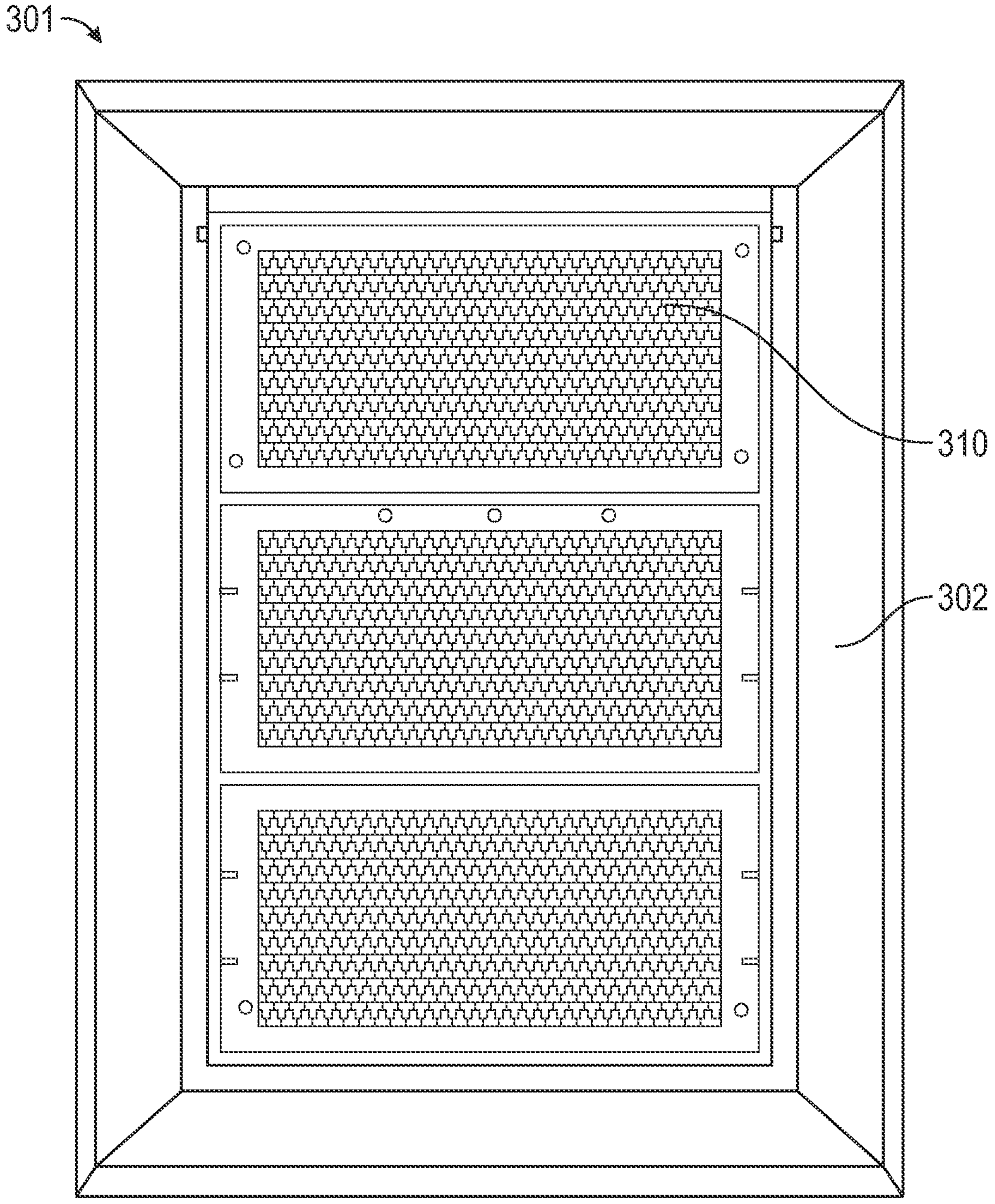
FIG. 4 is perspective view of an embodiment of the pet travel door of the door panel illustrated in FIG. 3.
Figure 5:
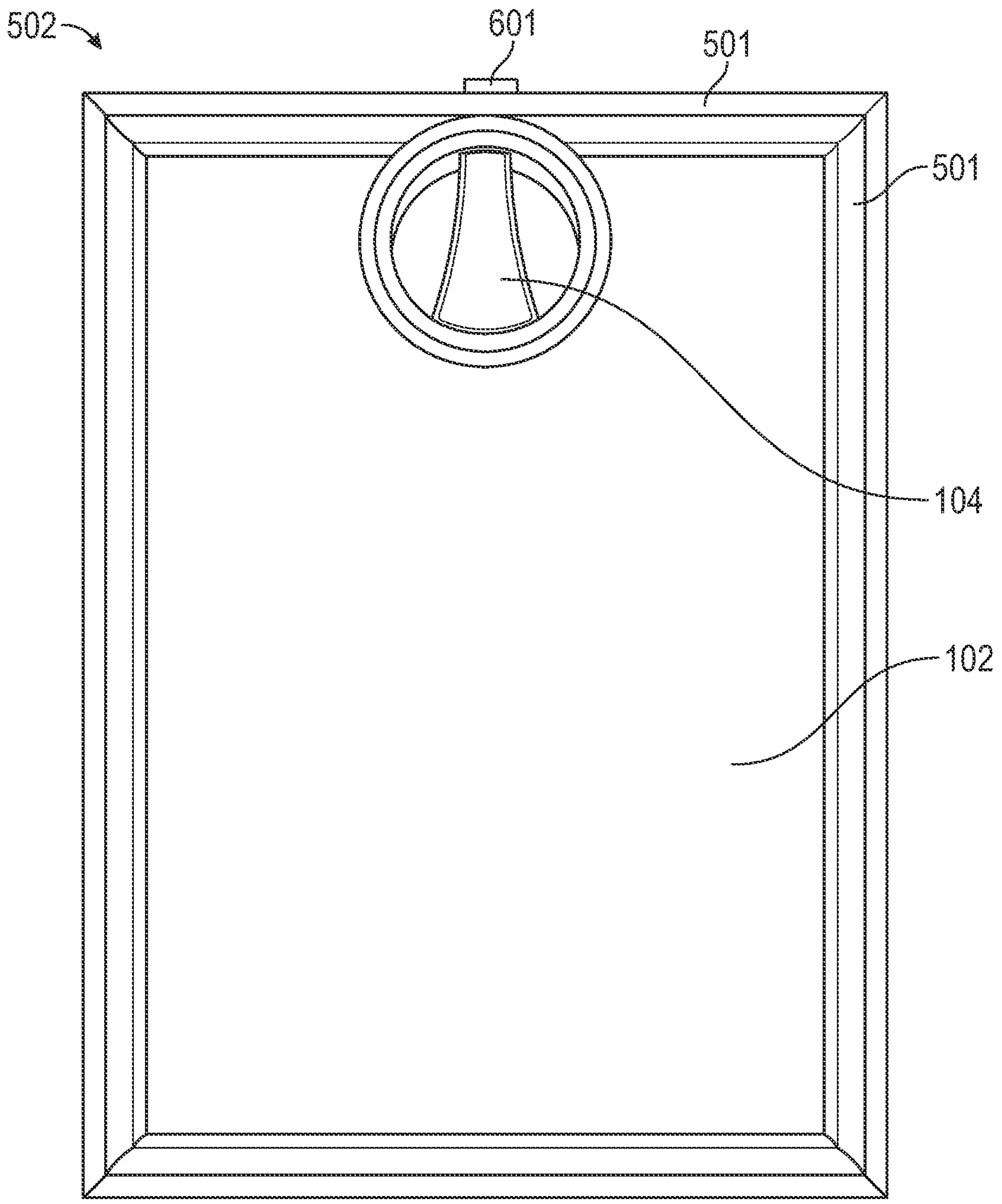
FIG. 5 is a perspective view of a security panel of the pet travel door according to an embodiment of the present invention and showing a lock member in the locked position.
Figure 6:
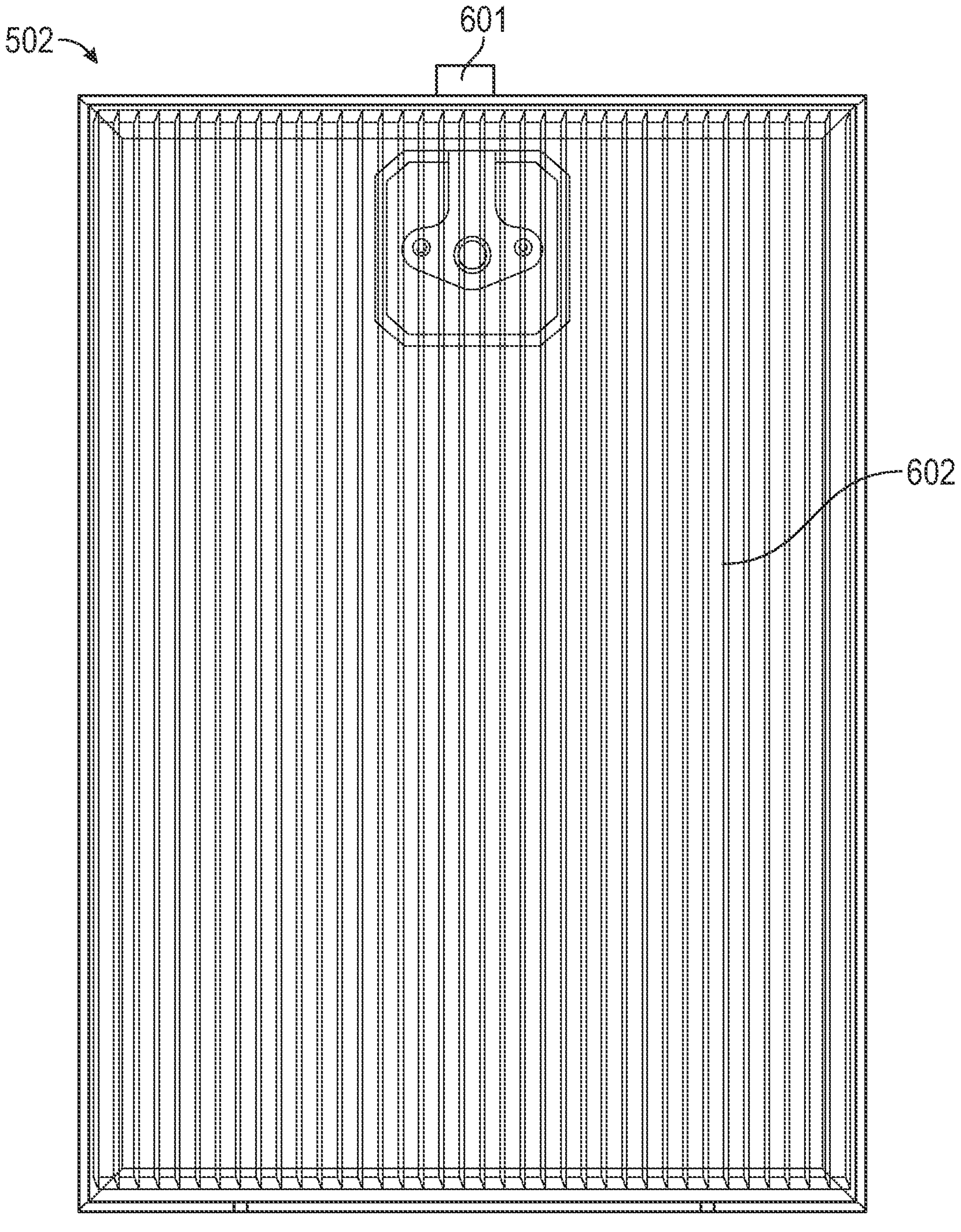
FIG. 6 is a rear perspective view of the security panel of FIG. 5.
Figure 7:
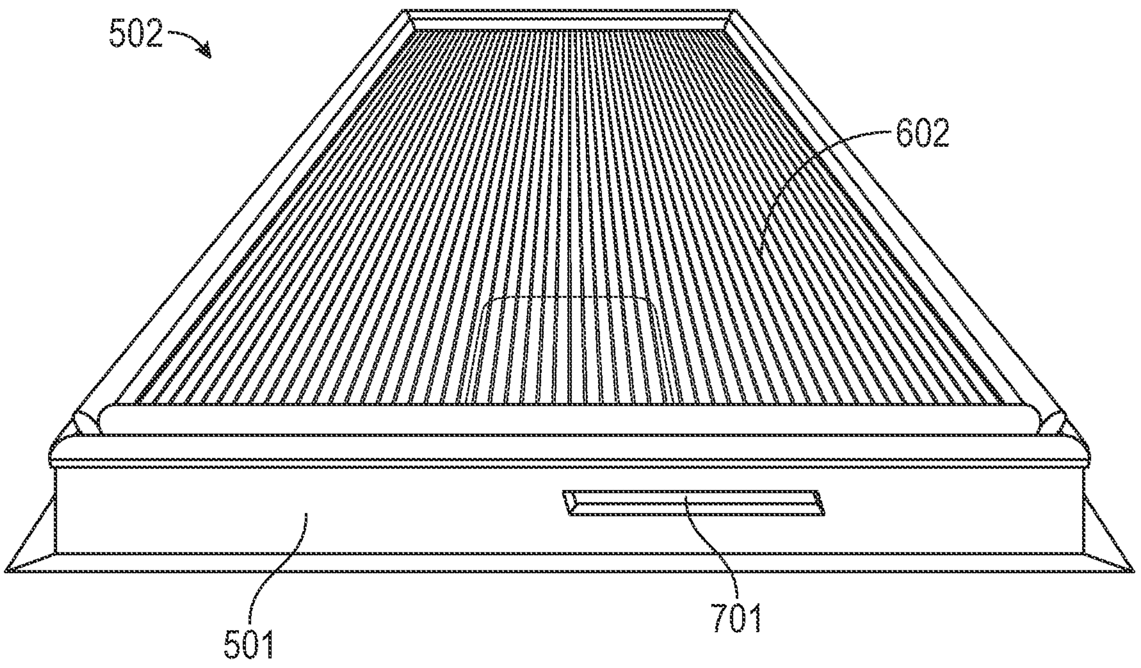
FIG. 7 is an upper perspective view of the security panel of FIG. 5.
Figure 8:
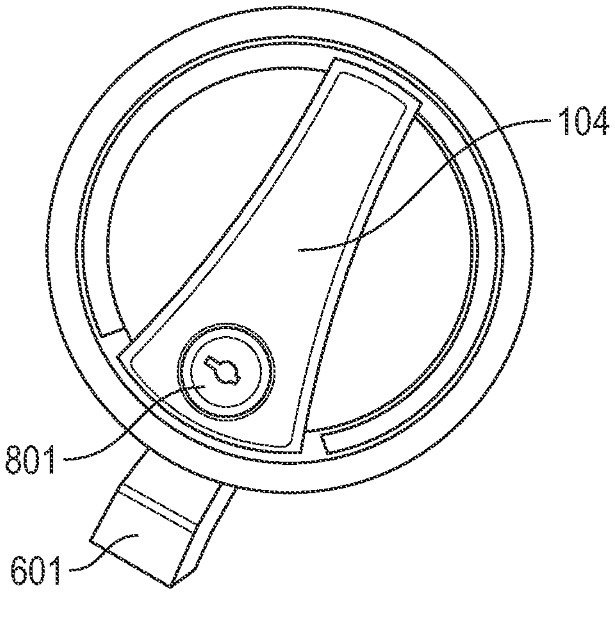
FIG. 8 is a perspective view of a lock member of the security panel illustrated in FIG. 5.
Figure 9:
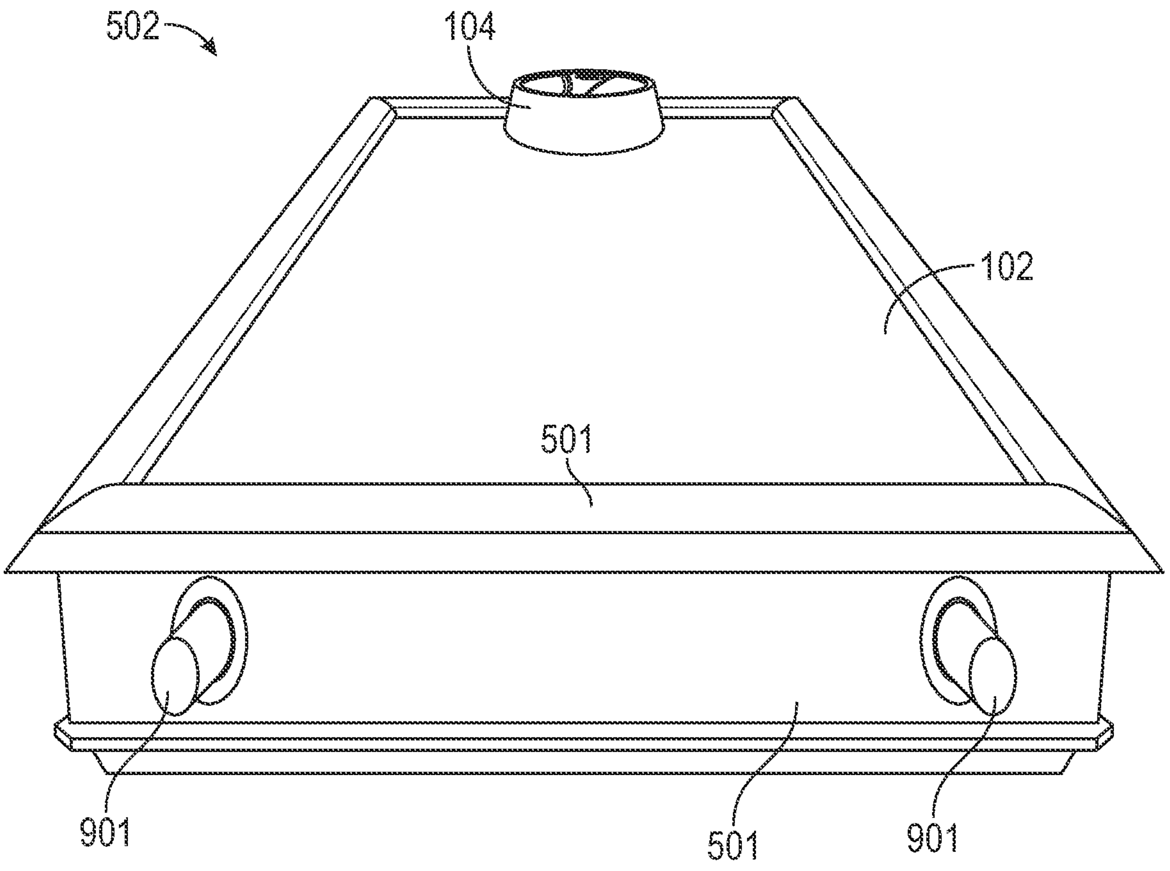
FIG. 9 is a lower perspective view of the security panel according to FIG. 5.

An embodiment of the invention, as shown and described by the various figures and accompanying text, provides a reinforce pet door system that may include a pet travel door 301, illustratively shown in FIGS. 3 and 4, a door panel 303 with an integrated pet travel door 301, illustratively shown in FIG. 3, and a security panel 502 as illustratively shown in FIG. 5. The pet travel door 301 may comprise of a number of different types of pet travel doors, for example, without limitation, sliding, single flap, partitioned flap, magnetized bottom flap, magnetized sliding, or other pet travel door as understood by those skilled in the art that may be used. The pet travel door 301 may comprise of a number of different materials including, but not limited to, polycarbonate, plastic, metal, or ceramic. Those skilled in the art will notice and appreciate that a number of different pet travel doors and materials may be used as the pet travel door 301 while still accomplishing all the goals, features, and advantages of the present invention.

Figure 1A:
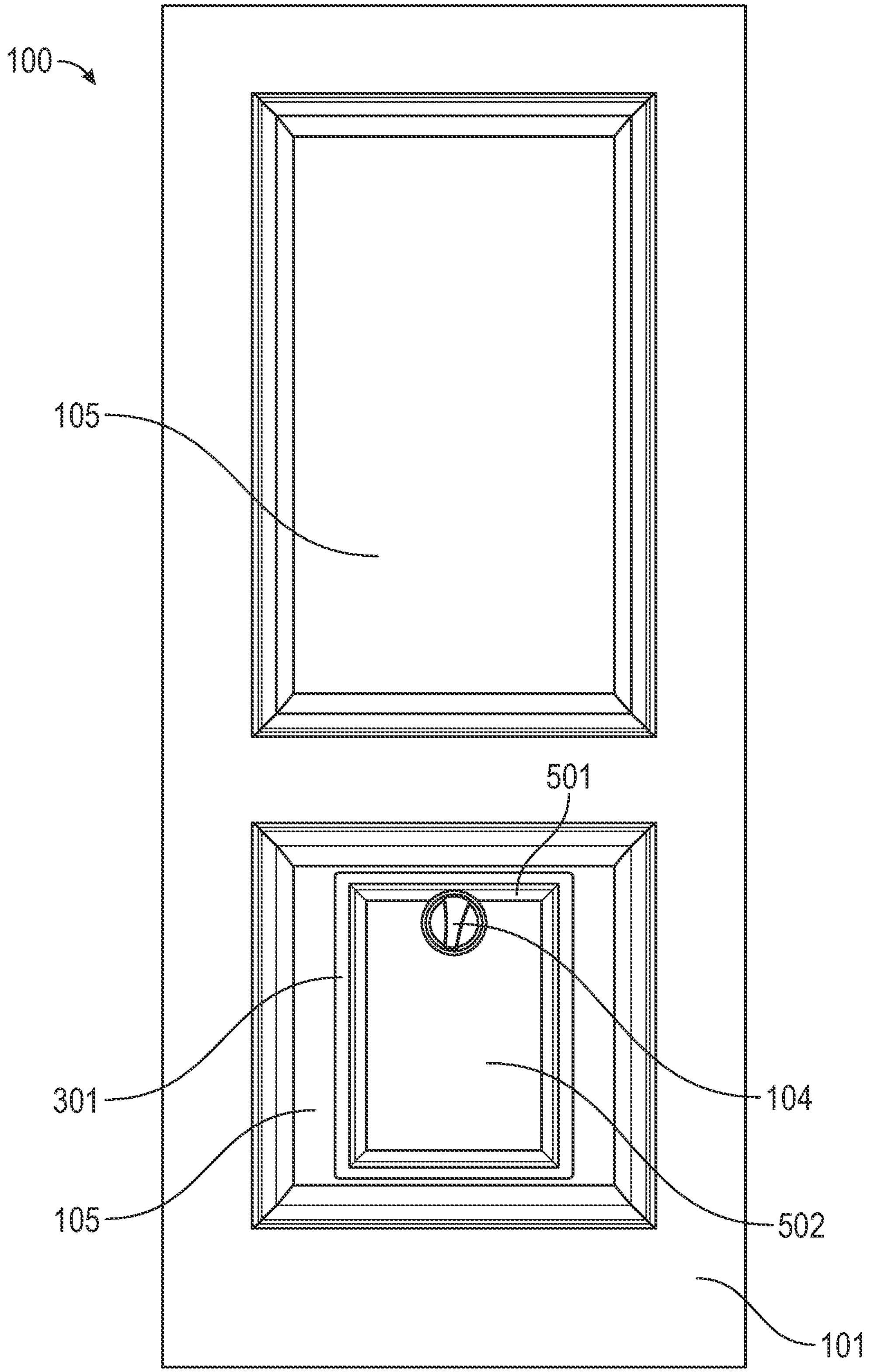
FIG. 1A is a perspective view of a door having an integrated pet travel door according to an embodiment of the present invention and having a security panel installed.
Figure 1B:
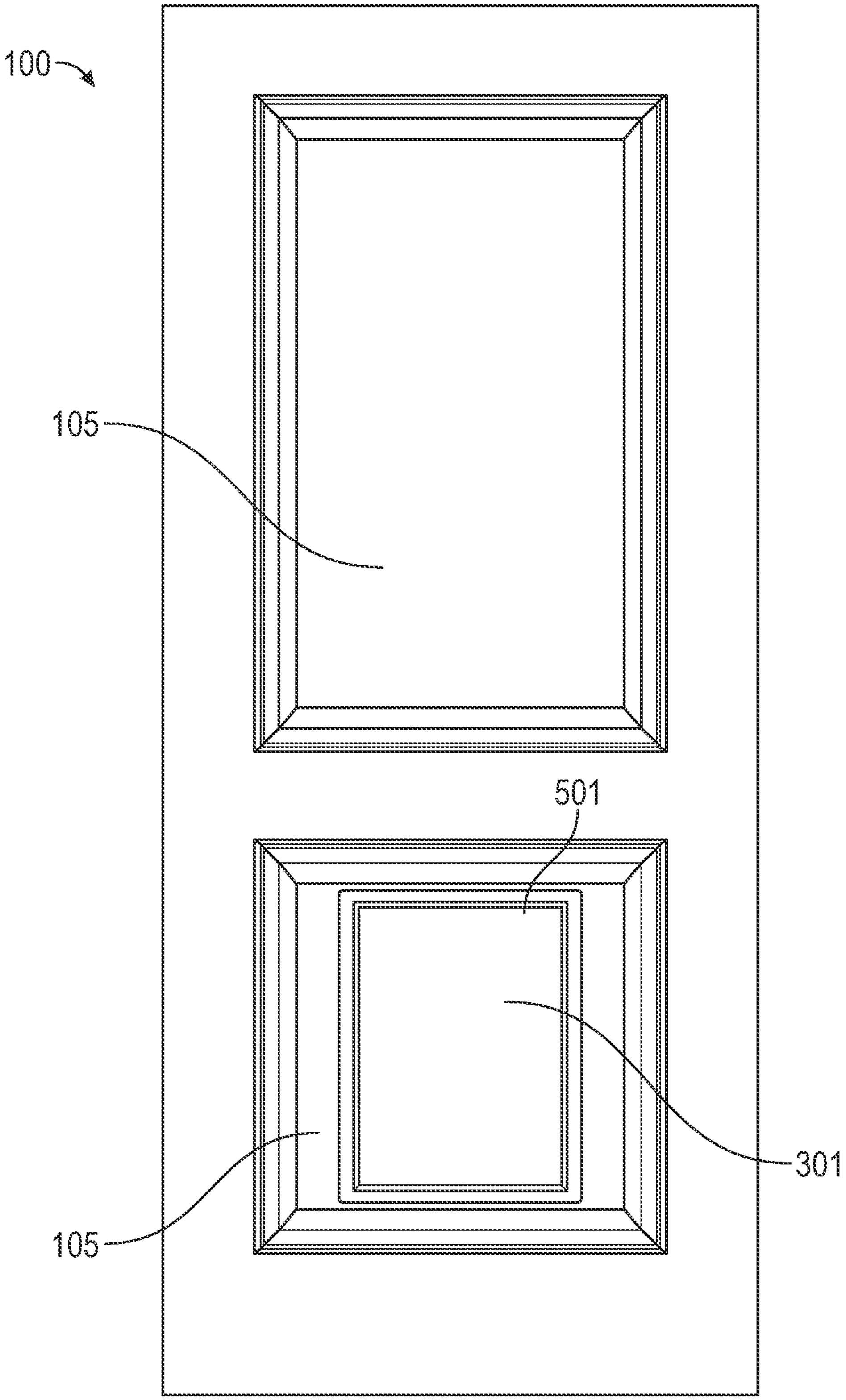
FIG. 1B is a perspective view of the door illustrated in FIG. 1A and having the security panel removed.

Referring initially to FIGS. 1A and 1B, an embodiment of the pet door system according to the present invention is now described. This embodiment of the pet door system is directed to a door 100 having an integrated pet travel door 301. The integrated pet travel door 301 is preferably configured to be installed into a main body member 101 of a door 100. The main body member 101 may include a number of door panels 105 where the pet travel door 301 may be installed into. The pet travel door 301 is preferably installed in the lowest door panel 105 of the main body member 101, as illustrated in the appended drawings. Those skilled in the art, however, will appreciate that should it be desired, the pet travel door 301 may be installed anywhere on the main body member 101 of the door 100. For example, if so desired, the pet travel door may be installed on an upper panel of the door 100, or off set from a central vertical line of the door. However, it is preferable, from both a functional and an aesthetic perspective, to provide the pet travel door 301 installed in the lower panel 105 of the main body member 101 of the door 100.

Figure 2:
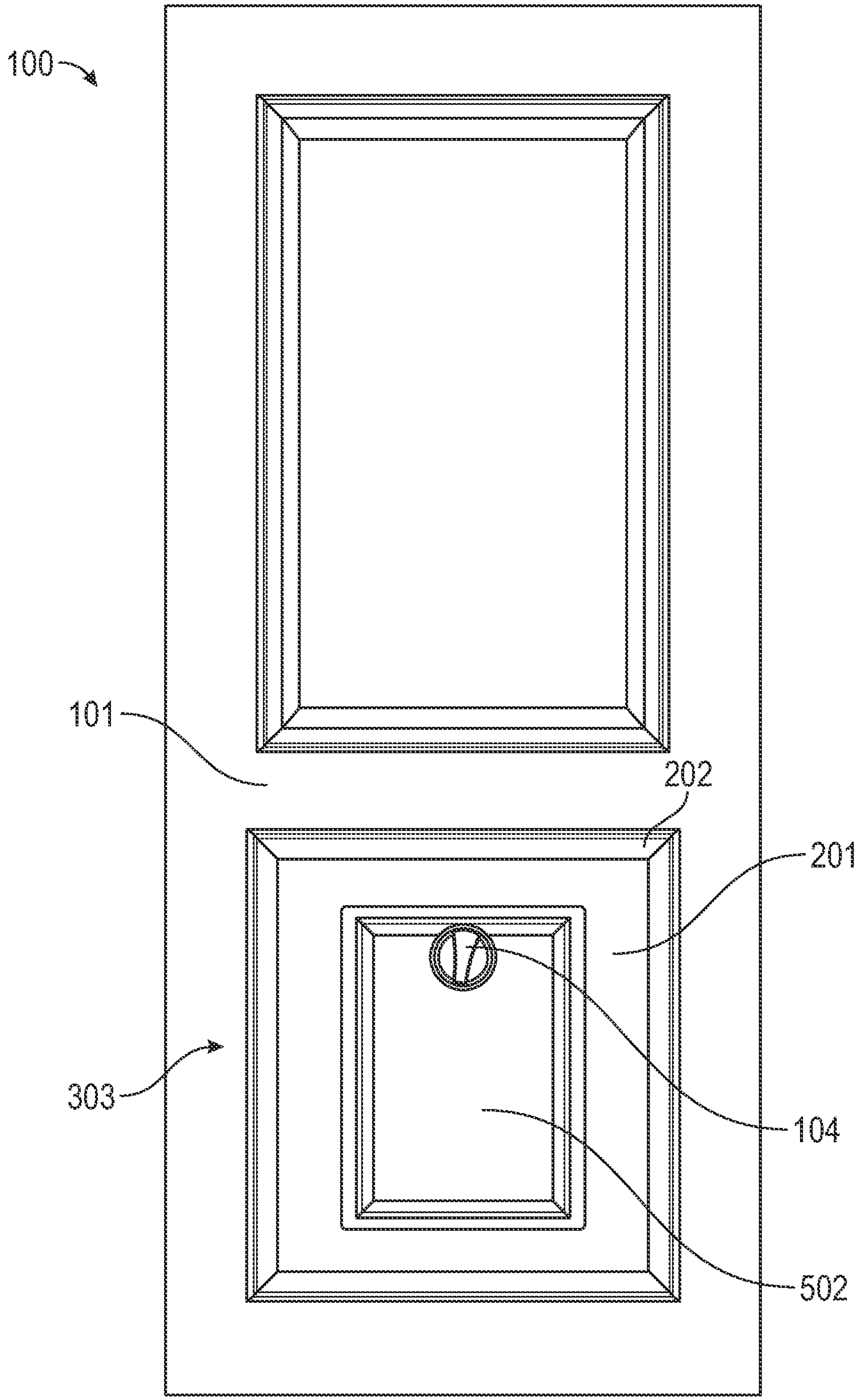
FIG. 2 is a perspective view of a door panel having a pet travel door installed therein and being installed in a door according to an embodiment of the present invention.
Figure 3A:
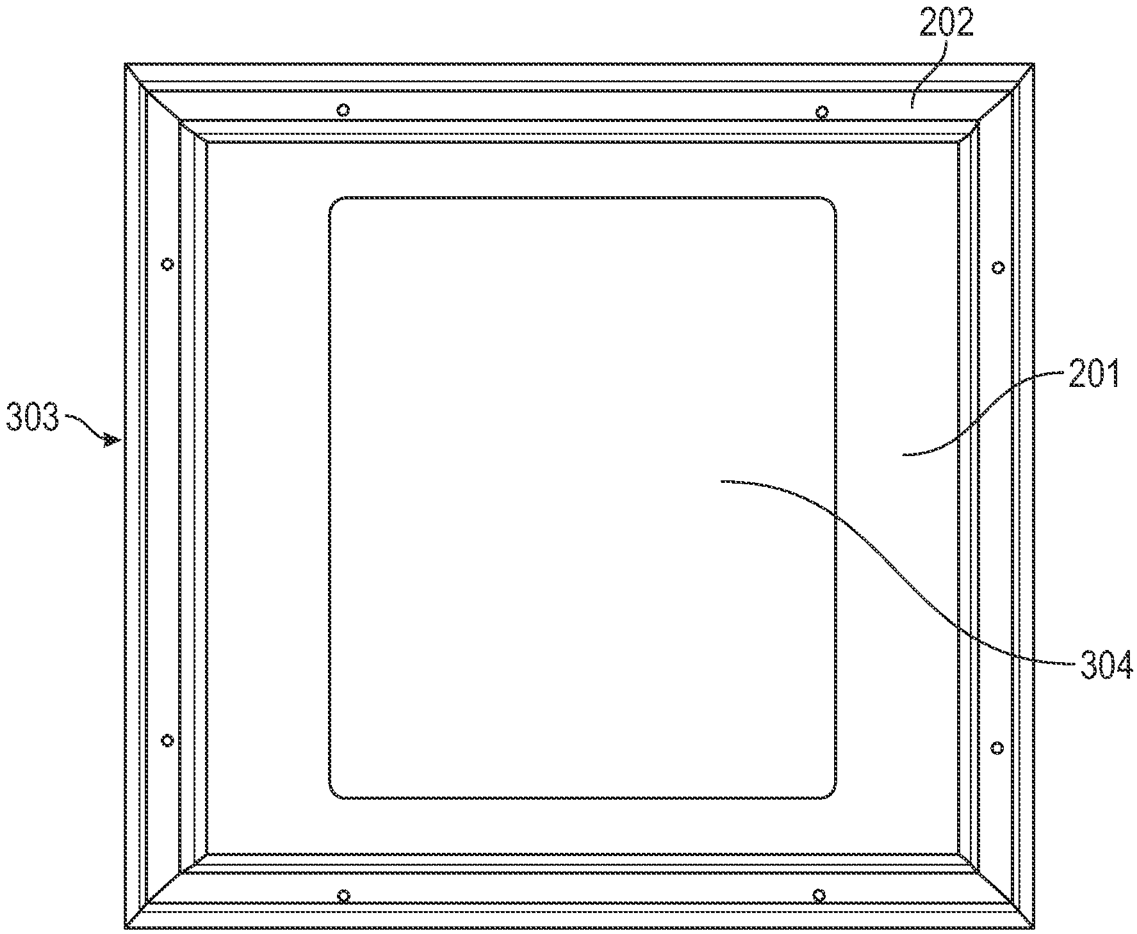
FIG. 3A is a perspective view of the door panel illustrated in FIG. 3 having the pet travel door removed to show a passageway.

Now referencing FIGS. 2, 3, and 3A, another embodiment of the present invention directed to a door panel 303 having an integrated pet travel door 301 installed therein. The door panel 303 having the integrated pet travel door 301 installed therein may be provided to be installed into a door. For example, a door manufacturer may install the door panel 303 having the integrated pet travel door 301 into an existing door where a panel 105 may have been otherwise located.

The pet travel door 301 may be installed into a body member 201 of the door panel 303. The body member 201 of the door panel 303 that has the pet travel door 301 installed therein may be installed into a main body member 101 of a door 100 that has a portion or all of one of its door panels 105 removed. Those skilled in the art will appreciate that it contemplated that the door panel 105 may be removed after manufacture of the door 100 to allow for installation of the door panel 303 in the door 100, or that the door 100 may be manufactured without the door panel 105 to similarly allow for installation of the door panel 303 having the integrated pet door 301 according to the present invention. The main body member 101 that the body member 201 is installed into may not require that a door panel 105 is removed and may only require removing a portion of the main body member 101 so that the door panel 201 may be matingly installed into the main body member 101. Those skilled in the art will also appreciate that the door panel 303 having the integrated pet travel door 301 may also be installed into a door 100 that does not include door panels. In such a case, it is contemplated that a passageway will be formed in the door 100 to accommodate installation of the door panel 303 having the pet travel door 301 integrated therein. The body member 201 may comprise of a number of different insulating and non-insulating materials. The insulating materials that may be used as the body member 201 may be, without limitation, fiberglass, expanded polystyrene, polyurethane, mineral wool, cellulose, E-glass reinforced fiberglass, S-glass reinforced fiberglass, aramid reinforced fiberglass, carbon reinforced fiberglass, and other materials as recognized by those skilled in the art to be used as and/or in the body member 201 of an embodiment of the present invention.

Moreover, as mentioned further below, the body member 201 may comprise of a door panel that was cut out of a door during the manufacturing process of said door. Door panels that are cut out of a door during the manufacturing process are generally discarded and eventually located in a land fill with other construction waste and debris. The present invention can advantageously repurpose that which would have been wasted or environmentally unfriendly trash/debris, and using it to carry out the goals, features and advantages of the present invention. Therefore, the present invention is environmentally friendly and helps to reduce waste.

Continuing to reference FIG. 3A, the door panel 105 that is a separate object from a main body member 101 (such as body member 201), or a door panel that is monolithically formed a part of a main body member 101 (such as one of the door panels 105 in the main body member 101 as illustratively shown in FIGS. 1A and 1B) may include a passageway 304 that is formed through one face of the body member 201 (or door panel 105) and out an opposite side/face. The passageway 304 may be sized to accommodate the size of the pet travel door 301.

Continuing with reference to FIGS. 2, 3 and 3A, the door panel may include body frame members 202. The body frame members 202 may be affixed to an outer perimeter of the body member 201 of the door panel 303, and on a perimeter of the passageway 304 of a main body member 101. The passageway 304 may be configured to be a shape that may accommodate installation of the body member 201 that has the body frame members 202 affixed onto the outer perimeter of the body member 201. The body frame members 202 may be used to provide a seal when the door panel 303 is installed into the main body member 101 of the door 100 to advantageously protect an interior of a structure from elements of weather, such as wind, water, and ice. The body frame members 202 may be made from steel, aluminum, plastic, composite, ceramics, or any other material or combination thereof as understood by those skilled in the art that may be used as a body frame member 202. Those skilled in the art will notice and appreciate that a number of different materials may be used for the body frame member 202 while still accomplishing all the goals, features, and advantages of the present invention.

FIG. 4 depicts an alternative pet travel door 301 that may be used in connection with the present invention. The pet travel door 301 illustrated in FIG. 4 illustratively includes a segmented door 310. The segmented door 310 illustratively includes three segments. The three segments of the segmented door 310 are independently moveable with respect to one another. Accordingly, this may be advantageous for smaller animals that use the pet travel door 301. The pet travel door 301 illustrated in FIG. 4 also includes framing 302 that is described in greater detail below.

Figure 12:
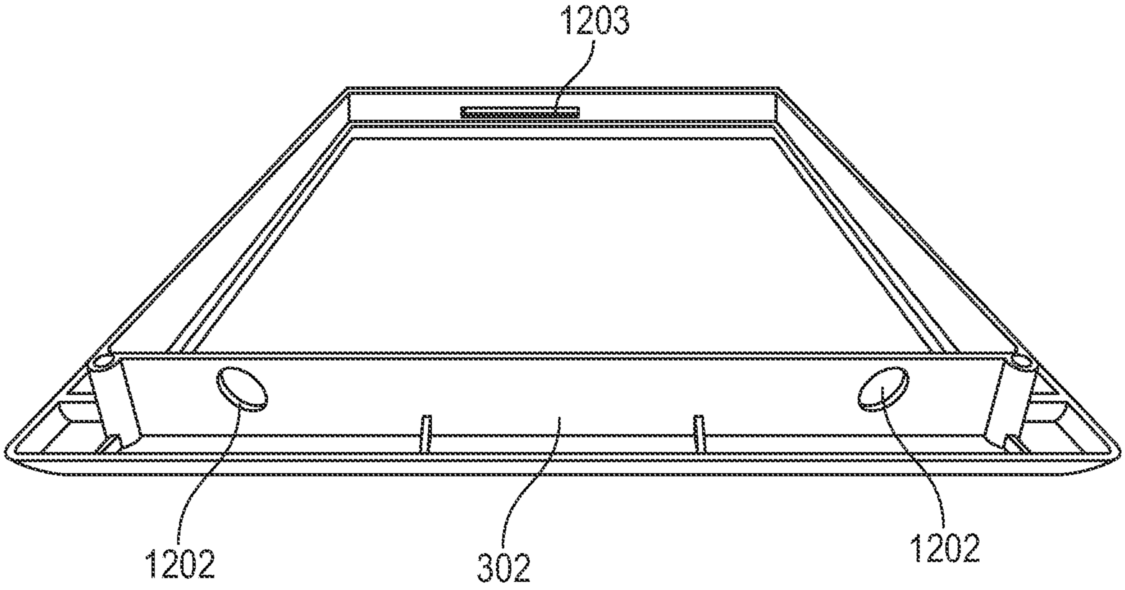
FIG. 12 is a lower perspective view of a pet travel door frame of the pet travel door according to an embodiment of the present invention.

Now referring back to FIGS. 1A, 1B, and further to FIGS. 4 and 12, a pet travel door 301 may include a pet travel door frame 302 that may be affixed to an outer perimeter of the pet travel door 301 and affixed to the passageway 304 that may be made in a body member 201 or a main body member 101. The pet travel door frame 302 may include a pet travel door frame lock slot 1203 that is located at an upper portion of the pet travel door frame 302. The pet travel door frame 302 may also include one or more pet travel door frame through channels 1202 that may be located at a lower portion of the pet travel door frame 302. The pet travel door frame 302 may be made from plastic, composite, aluminum, steel, or any other material as understood by those skilled in the art to be used as a pet travel door frame 302. Those skilled in the art will notice and appreciate that a number of different materials may be used as the pet travel door frame 302 while still accomplishing all the goals, features, and advantages of the present invention.

Now referencing FIGS. 5-9, an embodiment of the present invention may include a security panel 502. The security panel 502 may be adapted to cover the pet travel door 301 on the outdoor and/or the indoor facing side of the pet travel door 301. The security panel 502 may be adapted to cover the pet travel door 301 by placing the security panel 502 overlaying the pet travel door 301. The security panel 502 may include a lock member 104, a pair of post structural members 901, a number of seal members 501, a security panel body member 102, and a reinforcement panel 602. The security panel body member 102 may be a cutout of a door panel from a door, such as door panels removed from doors during the manufacturing process of the door that otherwise would be treated as a waste product may instead be repurposed to be used as the security panel body member 102 or the body member 201 for an embodiment of the present invention. Those skilled in the art will appreciate that this act of recycling decreases the environmental impact of the door manufacturing process and decreases the cost of creating an embodiment of the present invention. The security panel body member 102 may comprise of insulation materials to increase the security panel's 502 effectiveness at reducing elements of weather from passing through an embodiment of the present invention. The material of the security panel body member 102 may comprise of structural fiberglass such as, without limitation, E-glass reinforced fiberglass, S-glass reinforced fiberglass, aramid reinforced fiberglass, and carbon reinforced fiberglass or any material as understood by those skilled in the art that may be used as the security panel body member 102. Those skilled in the art will notice and appreciate that the security panel body member 102 may comprise of a number of different materials while still accomplishing all the goals, advantages, and goals of the present invention.

The reinforcement panel 602 may be affixed to a face on the security panel body member 102, preferably a back-side face of the security panel body member 102. The material used for the reinforcement panel 602 may be, without limitation, polycarbonate. Those skilled in the art will recognize that the reinforcement panel 602 may comprise of a number of different materials while still accomplishing all the goals, features, and advantages of the present invention. The reinforcement panel 602 may be adapted to cover the same area as the face of the security panel body member 102 that the reinforcement panel 602 is attached to. Those skilled in the art will appreciate that the frame 302 of the alternative pet travel door 301 illustrated in FIG. 4 may also be made of a polycarbonate material to provide enhanced reinforcement.

The lock member 104 may be carried by a front face of the security panel body member 102, and preferably at a top portion of the front face of the security panel body member 102. The lock member 104 may include a locking arm 601 that may be attached to the lock member 104. The lock member 104 may be rotatably movable between a locked position and an unlocked position. The locked position of the lock member 104 may be defined by the locking arm 601 being positioned to extend outwardly from the door and to engage a security panel body member lock slot 701 (discussed in greater detail below). The unlocked position of the lock member 104 may be defined by the locking arm 601 being rotatably positioned so as not to engage the security panel body member lock slot 701.

Those skilled in the art will notice and appreciate that a number of different types of locks may be implemented as the lock member 104 while still accomplishing all the goals, features, and advantages of the system. For example, without limitation, a padlock, a deadbolt, a lever handle, a cam lock, a euro profile cylinder, a mortise lock, a T-handle lock, a rim latch lock, a multi-point lock, a key-operated security lock, a closed shackle lock, a straight shackle lock, an open shackle padlock, a long shackle padlock, electronically operated locks, and many other lock types known by those skilled in the art may be used as the lock member 104 while still accomplishing all the goals, features, and advantages of the system.

The lock member 104 may include a key lock 801 that is connected to the lock member 104. The key lock 801 may be configured so that when the key lock 801 is in a locked position the lock member 104 is restricted from rotatably moving, and when the key lock 801 is not in the locked position the lock member 104 is unrestricted and is free to rotatably move. The security panel body member 102 may include a security panel body member lock slot 701 that may be configured to allow for movement of the locking arm 601 when the lock member 104 is in the locked and/or unlocked positions. Details for the lock member's 104 locking functions follow further below.

Those skilled in the art will notice and appreciate that a verity of different types of locks may be used as the key lock 801 while still accomplishing all the goals, features, and advantages of the present invention. For example, without limitation, the key lock 801 may comprise of a combination lock, a touchscreen security lock, a proximity signal lock, a deadbolt, a fingerprint reader lock, a remote signal lock, a biometric scanner lock, and/or other types of locks as understood by those skilled in the art.

Figure 20:
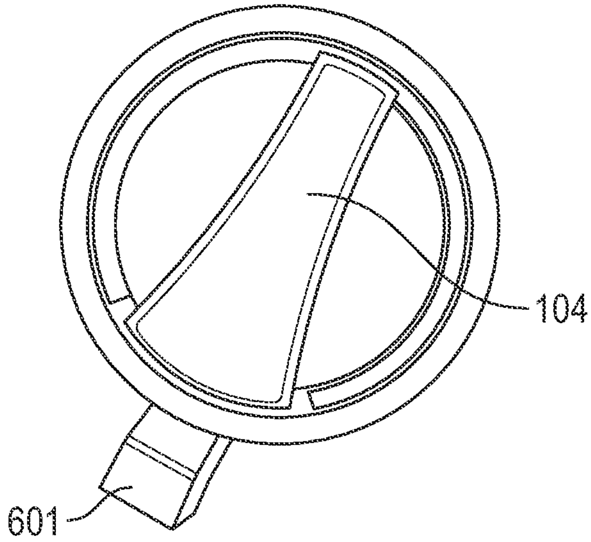
FIG. 20 is a perspective view of the lock member in FIG. 8 that does not include a key lock.

Embodiments of the present invention may not have a key lock 801 included with the lock member 104. Instead, some embodiments of the present invention may include a key lock 801 that is separate and not connected to the lock member 104. The key lock 801 may instead be carried by the security panel body member 102 and/or the body member 201. A key lock 104 that is not connected to the lock member 104 may include the same features and functionality as a key lock 104 that is connected to the lock member 104 as described herein. An embodiment of the present invention may also not include a key lock 104 as a component of the system so that the lock member 104 is the only component of the system with locking functionality, as illustratively shown in FIG. 20. Such an embodiment of the present invention may be preferable when the embodiment includes a security panel 502 that is installed to cover the indoor facing side of the pet travel door 301.

Figure 10:
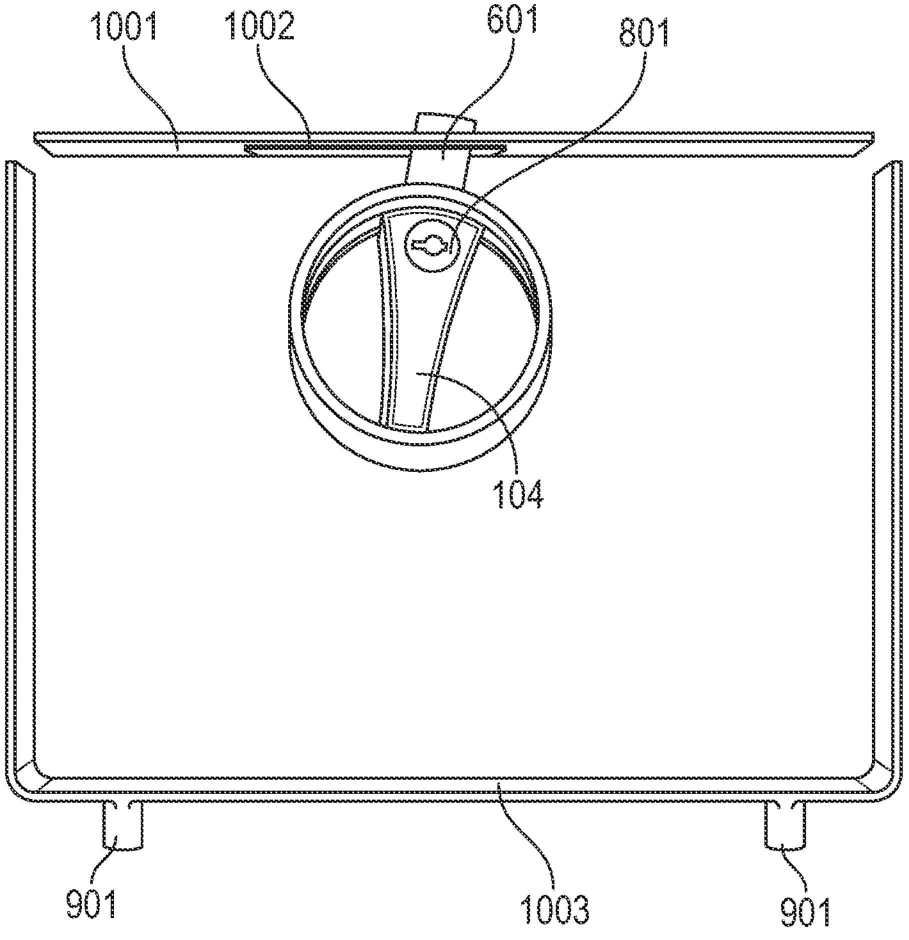
FIG. 10 is a perspective view of structural members and a lock member that connect to the security panel illustrated in FIG. 5.

Now additionally referencing FIG. 10, the security panel 502 may include an upper security panel structural member 1001 and a lower security panel structural member 1003. The upper security panel structural member 1001 may be attached to an upper portion of the security panel body member 102. The upper security panel structural member 1001 may include an upper security panel structural member lock slot 1002 that is positioned to align with and allow for the rotatable movement of the locking arm 601 of the lock member 104.

The lower security panel structural member 1003 may be attached to a lower portion of the security panel body member 102 and may include one or more structural post members 901 (also illustrated in FIG. 9) that may be affixed on a lower surface of the lower security panel structural member 1003 and may be oriented outwards. The structural post members 901 may be affixed to the lower security panel structural member 1003 or a part of the lower security panel structural member 1003 as a single monolithic unit.

Figure 21:
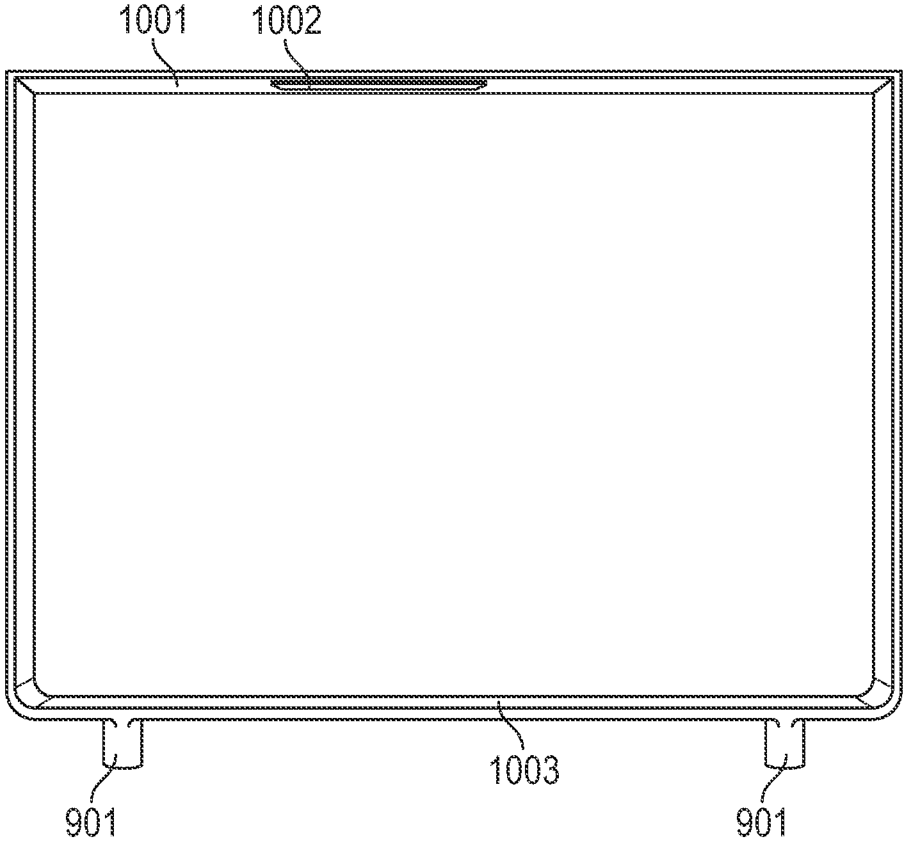
FIG. 21 is a perspective view of the components of the security panel illustrated in FIG. 10 connected together as a monolithic unit.

The lower security panel structural member 1003 may be in the shape of a "U" and configured to snugly form around the security panel body member 102 when affixed thereto. The lower security panel structural member 1003 may also be split into separate pieces, or the upper security panel structural member 1001 and the lower security panel structural member 1003 may be connected together as on single monolithic unit as illustratively shown in FIG. 21. Those skilled in the art will recognize and appreciate that there are a number of different shapes and configurations that the upper security panel structural member 1001 and the lower security panel structural member 1003 can include while still accomplishing all the goals, features, and advantages of the present invention.

Continuing with reference to FIGS. 5-10, seal members 501 may be affixed to an outer perimeter of the security panel body member 102 to substantially cover the outer perimeter of the security panel body member 102 and may be positioned to overly the upper security panel structural member 1001 and the lower security panel structural member 1003. Those skilled in the art will notice and appreciate that a number of materials and material combinations can be used for the seal members 501 while still accomplishing all the goals, features, and advantages of the present invention.

Figure 13:
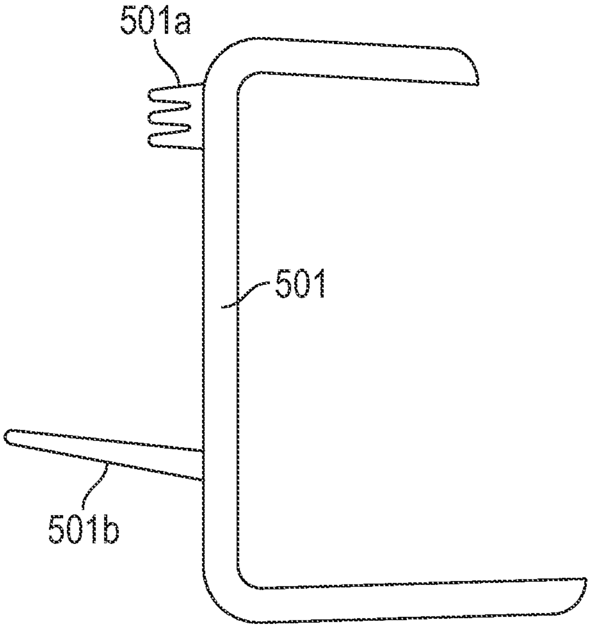
FIG. 13 is a side elevation view of an embodiment the seal member illustrated in FIGS. 11A and 11B.
Figure 14:
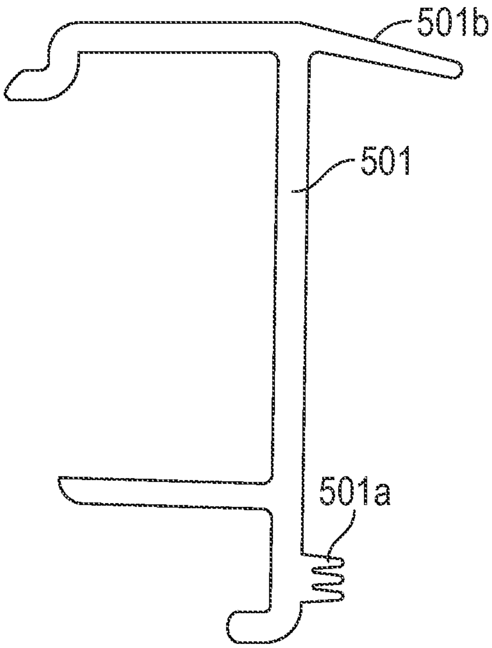
FIG. 14 is a side elevation view of another embodiment the seal member illustrated in FIGS. 11A and 11B.

The seal members 501 may include a grip member 501*a* and a sealing lip 501*b*, as illustratively shown in FIGS. 13 and 14. The grip member 501*a* may be used to hold the security panel 502 in place when the security panel 502 is installed to cover a pet travel door 301 when the pet travel door 301 is installed into a main body member 101 or a door panel 303. The grip member 501*a* may also act as an extra layer of sealant to keep weather elements from seeping past the security panel 502 when covering a pet travel door 301. The sealing lip 501*b* may comprise entirely of, or in part, a flexible material similar to the material that the seal member 501 is made of, in whole or in part. The sealing lip 501*b* may be used as the main component to seal the elements from passing through the security panel 502 when the security panel is installed covering the pet travel door 301.

The seal members 501 may include, without limitation, a heterogeneous combination of polyvinyl chloride and a flexible material. The flexible material used may be a rubber, plastic, composite, or other material as understood by those skilled in the art to be used as a flexible material that can be used for all or a portion of the seal member 501, the grip member 501*a*, and/or the sealing lip 501*b*.

Figure 11B:
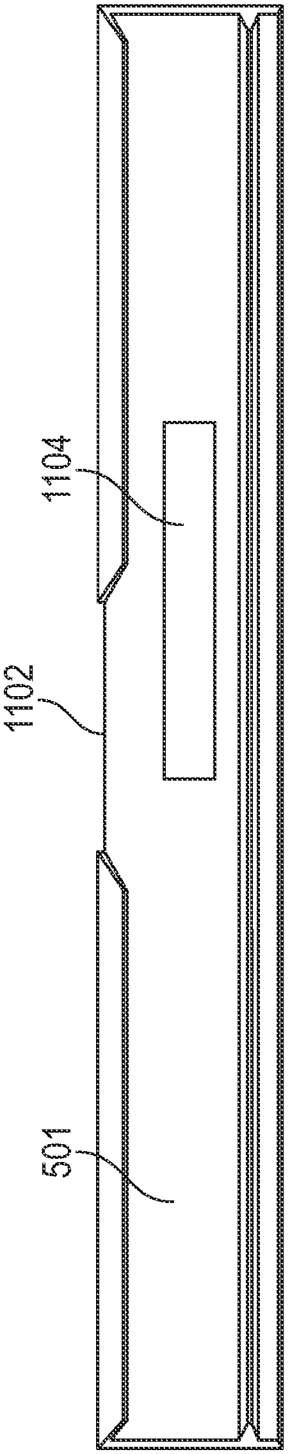
FIG. 11B is a plan view of a top seal member adapted to be connected to the security panel of FIG. 5.
Figure 11A:
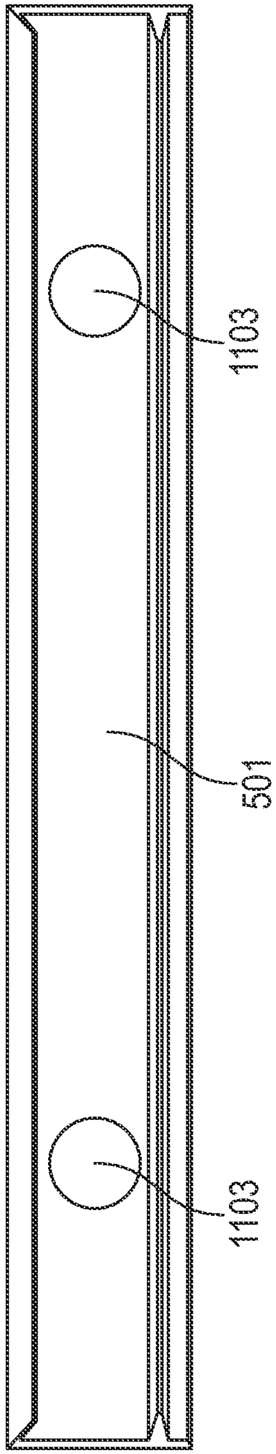
FIG. 11A is a plan view of a bottom seal member adapted to be connected to the security panel of FIG. 5.

Continuing with to reference FIG. 10, and additionally referencing FIG. 11, the seal member 501 that is located at the lower portion of the security panel body member 102 may contain a number of seal member through channels 1103 that are substantially aligned with the placement of the structural post members 901 on the lower security panel structural member 1003. A seal member 501 that may be located at an upper portion of the security panel body member 102 may contain a upper security panel lock slot 1104 that is positioned to align with the locking arm 601 of the lock member 104, and an arched cutout 1102 that may be located on one side of at least one of the seal members 501 that may be configured to accommodate the lock member 104 being carried by the security panel body member 102 without having the lock member 104 be positioned in conflict with the seal member 501 that may be closest to the lock member 104 when the lock member 104 is attached to the security panel body member 102.

Figure 17A:
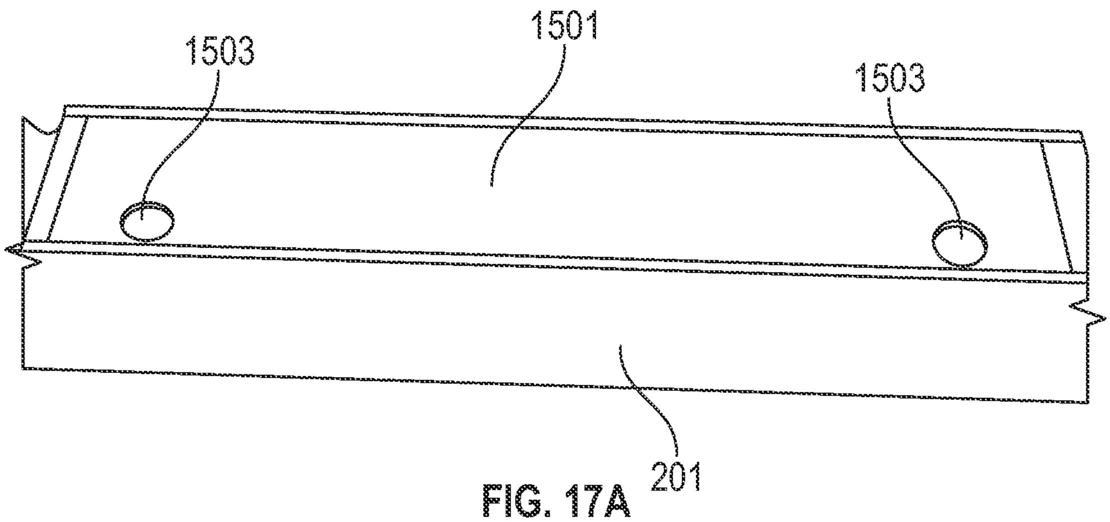
FIG. 17A is partial perspective view of the structural member illustrated in FIG. 15A being positioned in a recess formed in the lower portion of the body member or the door panel.
Figure 17B:
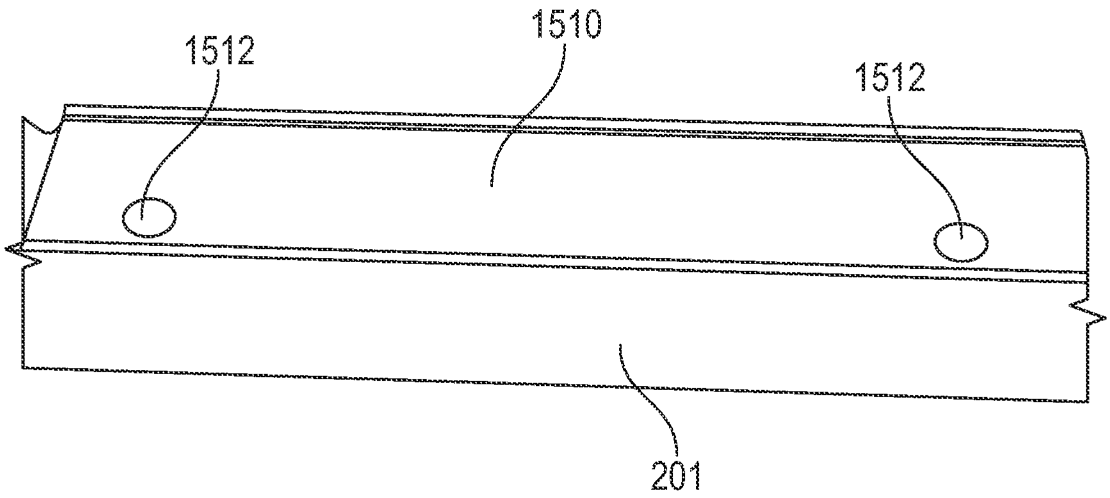
FIG. 17B is a partial perspective view of the body member or the door panel according to an embodiment of the present invention showing the recess formed therein.

Now referring to FIGS. 17A and 17B, an embodiment of the present invention may include a recess 1510 at a lower portion of the passageway 304. In the embodiment of the invention directed to the door 100 having an integrated pet travel door 301 formed therein (illustrated in FIGS. 1A and 1B), the recess 1510 is formed in the body member 101 of the door 100. Although the embodiment of the invention relating to the door 100 having the integrated pet door 301 does not show a passageway prior to the door panel being installed therein is shown, those skilled in the art will appreciate that the recess 1510 is formed in a lower portion of the door panel 105. In the embodiment of the invention directed to a door panel 303 having a pet travel door 301 installed therein that is separated from the door 100 and adapted to be positioned in a space in door 100 where a door panel 105 may have otherwise been located (illustrated in FIGS. 2, 3 and 3A), the recess 1510 may be formed in the body member 201 of the door panel 303.

As also illustrated in FIGS. 17A and 17B, one or more receiving channels 1512 may be provided to receive the structural post members 901. Within the recess 1510 there may be a structural member 1501 that is matingly engaged within the recess 1510. On the structural member 1501 there may be one or more structural member through channels 1503 that may be positioned to align with the receiving channels 1512 on the recess 1510.

Figure 16A:
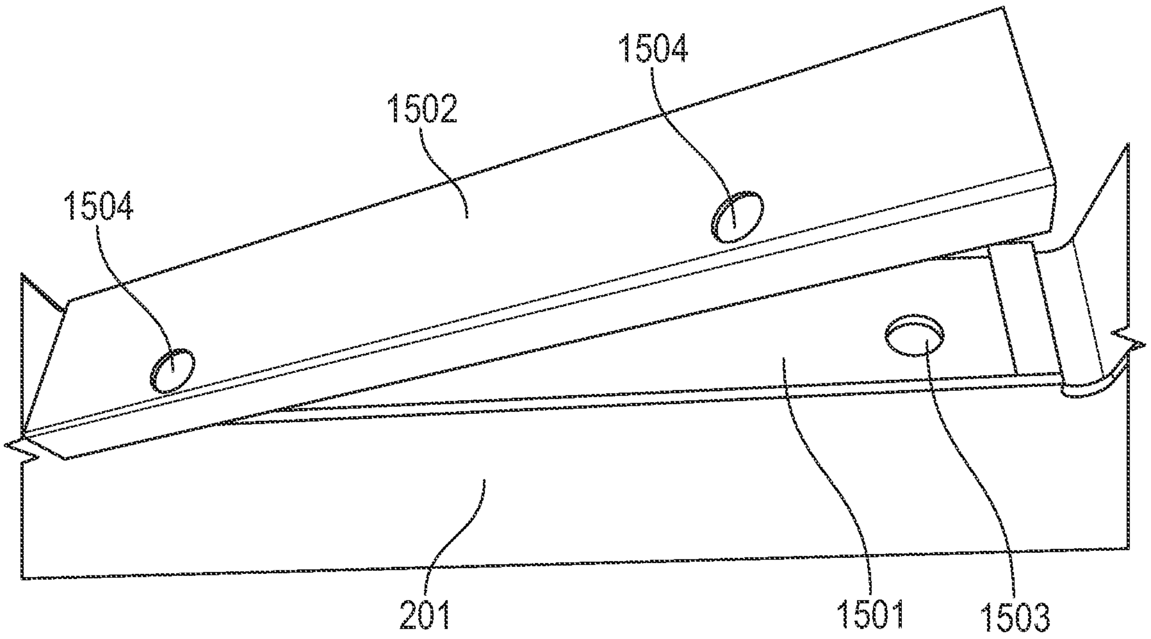
FIG. 16A is a partial perspective view of the U-shaped structural member illustrated in FIG. 15A being placed over the structural member and body member or door panel.
Figure 18A:
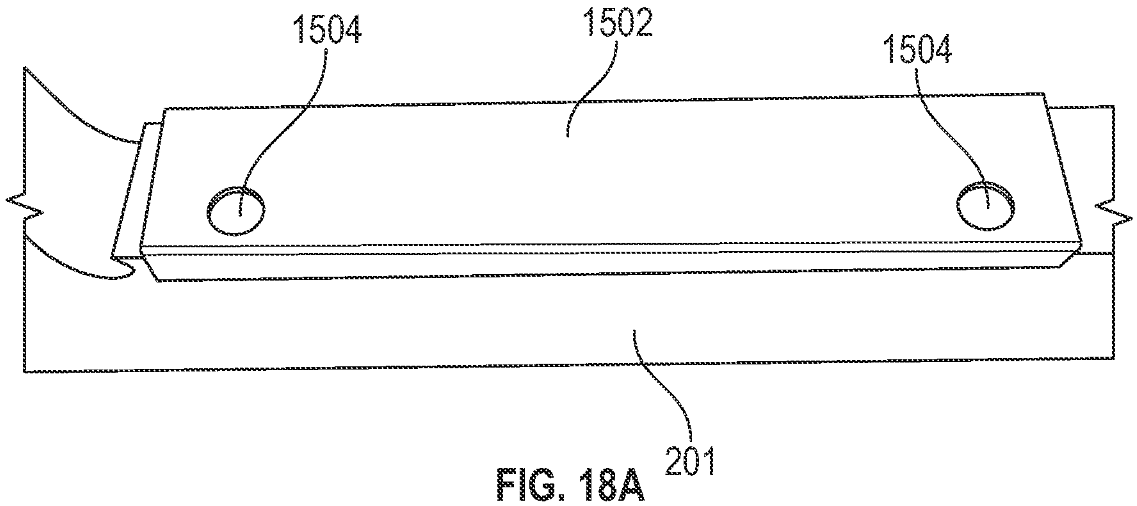
FIG. 18A is a partial perspective view of the U-shaped structural member illustrated in FIG. 15A and being positioned over the structural member and the lower portion of the body member or the door panel.

As illustrated in FIG. 18A, the U-shaped structural member 1502 may be placed to overly the structural member 1501 and the recess 1510. The U-shaped structural member 1502 may include one or more U-shaped structural member through channels 1504 (illustrated in FIG. 16A) that may be positioned to align with the structural member through channels 1503 and the receiving channels 1512.

Figure 15A:
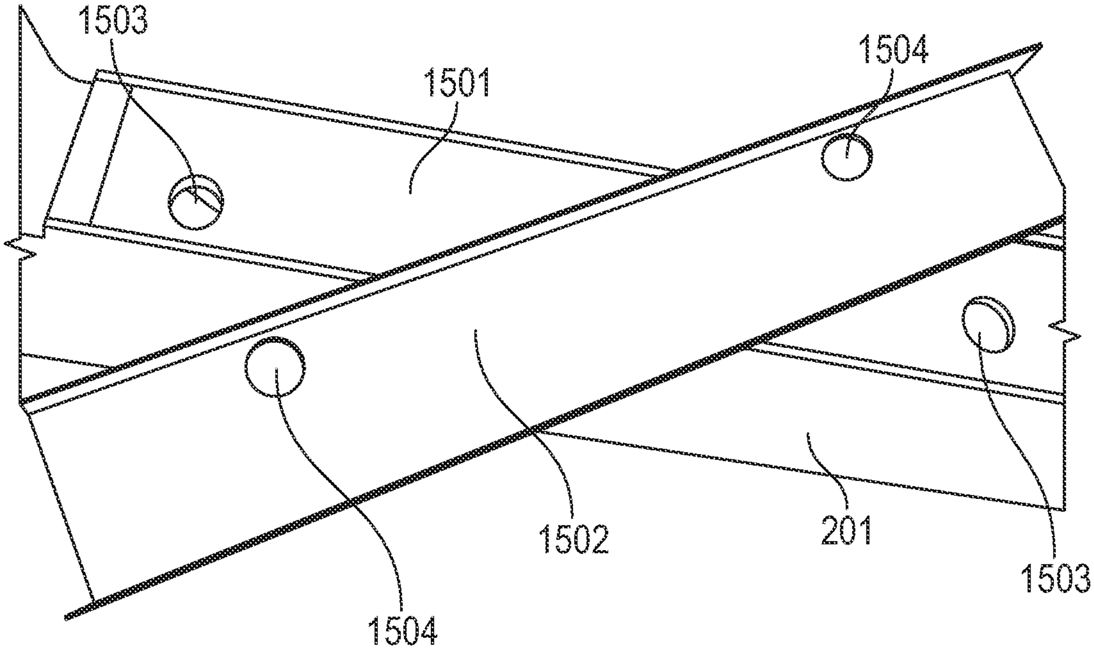
FIG. 15A is a partial perspective view of a structural member, a U-shaped structural member, and a lower portion of a body member or door panel according to an embodiment of the present invention.
Figure 15B:
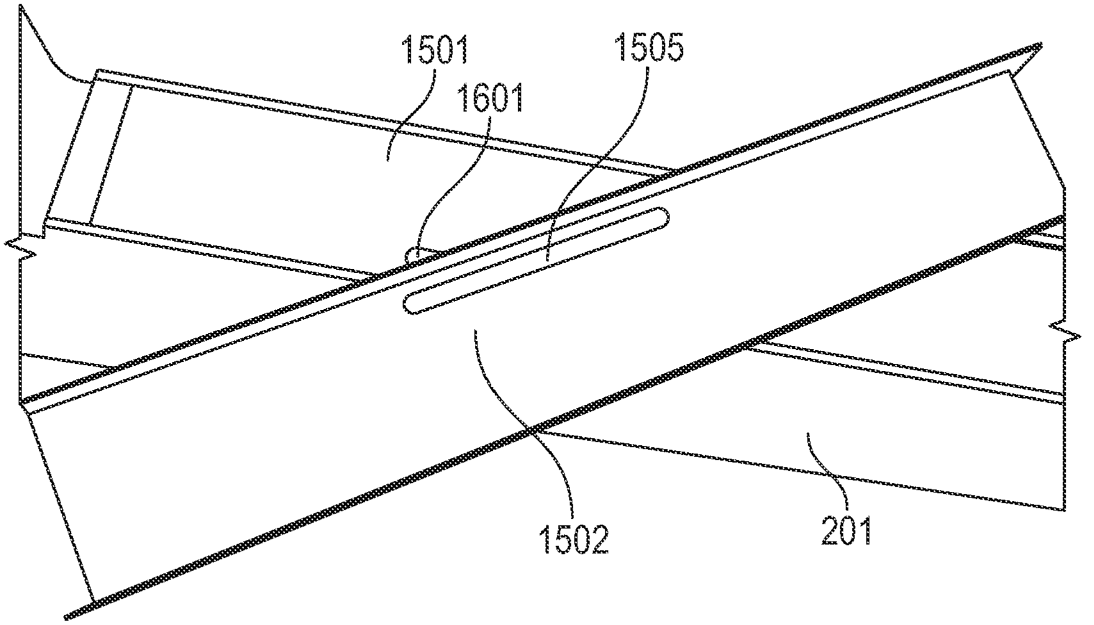
FIG. 15B is a partial perspective view of a structural member, a U-shaped structural member, and an upper portion of a body member or door panel according to an embodiment of the system.
Figure 16B:
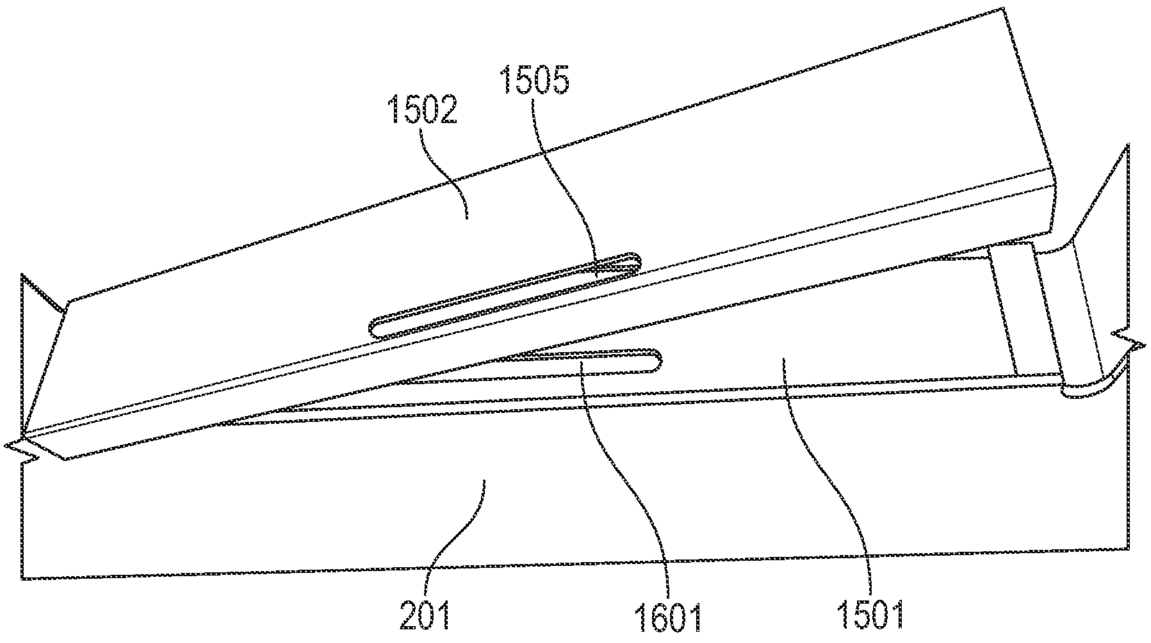
FIG. 16B is a partial perspective view of the U-shaped structural member illustrated in FIG. 15B being placed over the structural member and body member or door panel.
Figure 18B:
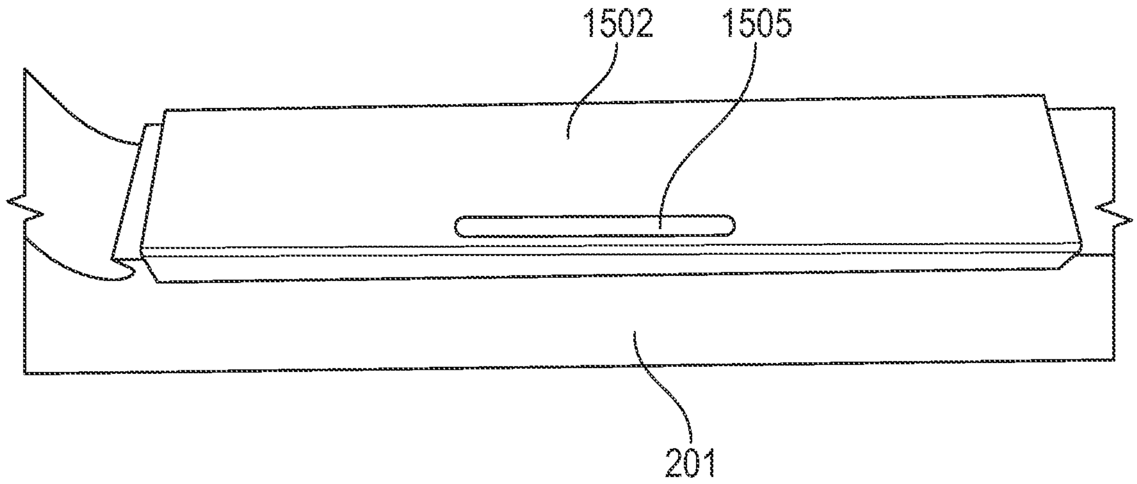
FIG. 18B is a partial perspective view of the U-shaped structural member illustrated in FIG. 15B and being positioned over the structural member and the upper portion of the body member or the door panel.

Now referring back to FIGS. 15B and 17B, at an upper portion of the passageway 304 that is in either the body member 201 or the door panel 105, there may be a recess 1510 that accepts the mating placement of a structural member 1501. Referring to FIG. 16B, the structural member 1501 may include a lock slot 1601 that may be configured to accept the engagement of the locking arm 601 when the lock member 104 is engaged. There U-shaped structural member 1502 may also include a structural member lock slot 1505 that may be configured to align with the structural member lock slot 1601 on the structural member 1501 that is placed in the recess 1510 at the upper portion of the passageway 304 of either the body member 201 or a door panel 105. The U-shaped structural member 1502 may be positioned to matingly engage and overly the structural member 1501, as illustratively shown in FIGS. 16B and 18B. The U-shaped structural member lock slot 1505 and the structural member lock slot 1601 may be positioned to align with one another.

Figure 22A:
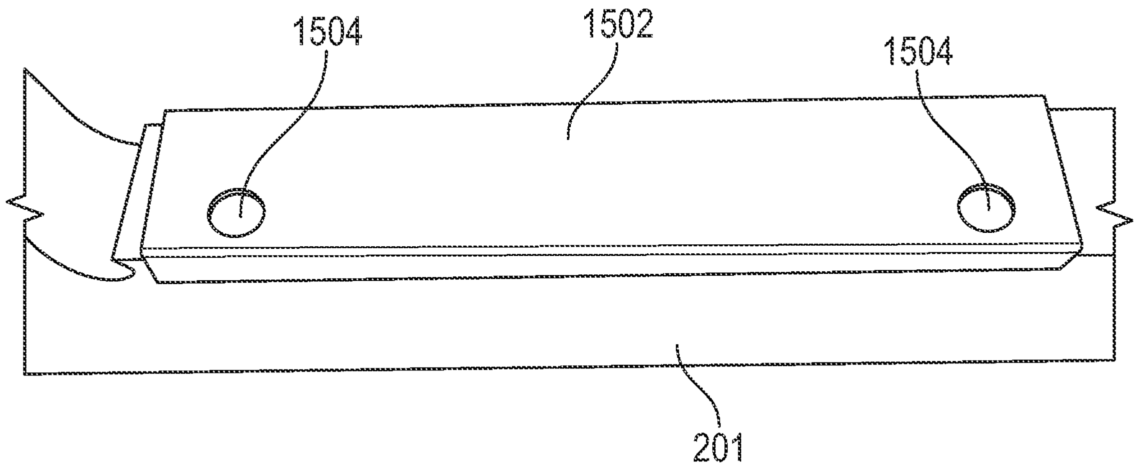
FIG. 22A is a partial perspective view of a U-shaped structural member being positioned over a lower portion of the body member or door panel according to the present invention without a structural member.
Figure 22B:
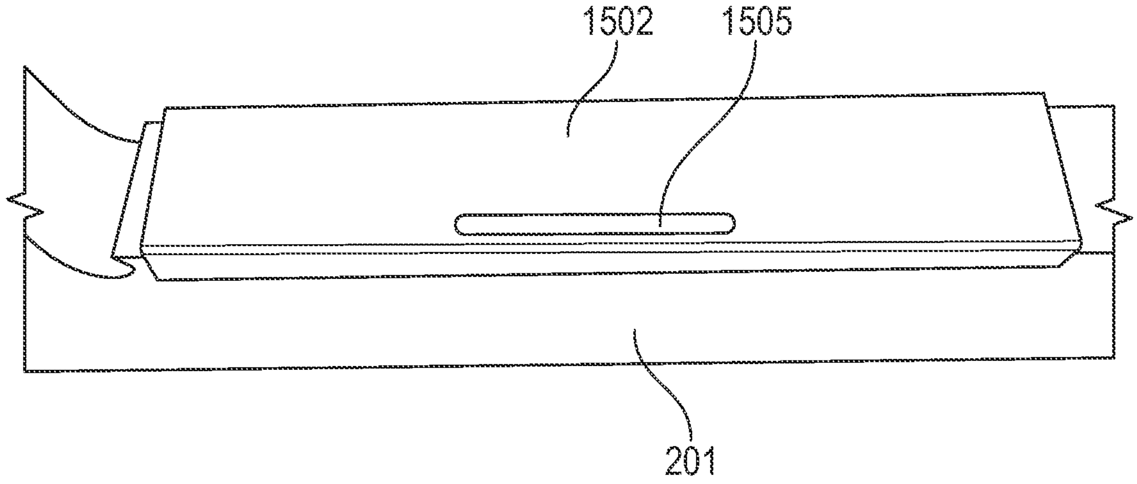
FIG. 22B is a partial perspective view of a U-shaped structural member being positioned over an upper portion of the body member or door panel according to the present invention without a structural member.

Now referencing FIGS. 22A and 22B, an embodiment of the present invention may not include a structural member 1501 and may only include a U-shaped structural member 1502 that may be adapted to be matingly placed to overly a lower portion or an upper portion of the body member 201. If only a U-shaped structural member 1502 is used, those skilled in the art will notice and appreciate that the U-shaped structural member's 1502 aforementioned features apply just the same even without any structural members 1501 or recesses 1510 while still accomplishing all the goals, features, and advantages of the present invention.

Now referring to FIG. 16B, the structural member lock slot 1601 is shown being formed through the structural member 1501. The structural member 1501 is preferably adapted to be positioned on the upper portion of the passageway so that the structural member lock slot 1601 is aligned with a lock slot formed in the body member 201. The alignment of the structural member lock slot 1601 with the lock slot formed in the body member 201 advantageously allows for rotatable movement of the locking arm 601 between the locked position where the locking arm is engaged with the U-shaped structural member lock slot 1505, the structural member lock slot 1601 and the lock slot formed through the body member 201, and the unlocked position where the locking arm 601 is disengaged from the U-shaped structural member lock slot 1505, the structural member lock slot 1601 and the lock slot formed through the body member 201.

Now referring back to FIG. 1A, the door panel 105 in a main body member 101 may have a door panel receiving slot that may be configured to allow for the mating engagement of the locking arm 601 when the lock member 104 is rotatably engaged or disengaged. The door panel 105 includes a similar configuration for the U-shaped structural member 1502, the recess 1501, the lock slots 1505 and 1601, and the through channels 1503 and 1504.

Now referring back to FIGS. 7, 10, 12, and 16B, the pet travel door frame lock slot 1203, the structural member lock slot 1601, the U-shaped structural member lock slot 1505, the upper security panel lock slot 1104, the upper security panel structural member lock slot 1002, the security panel body member lock slot 701, and/or a door panel lock slot (not shown) or body member lock slot (not shown) may be positioned to align with one another to allow for movement and engagement and disengagement of the locking arm 601 of the lock member 104.

Now referring additionally to FIG. 2, the locked position of the lock member 104 is defined by the locking arm 601 of the lock member 104 being positioned to engage the pet travel door frame lock slot 1203, the structural member lock slot 1601, the U-shaped structural member lock slot 1505, the upper security panel lock slot 1104, the upper security panel structural member lock slot 1002, the security panel body member lock slot 701, and/or the door panel lock slot (not shown) or body member lock slot (not shown).

The unlocked position of the lock member 104 is defined by the locking arm 601 being positioned to disengage the pet travel door frame lock slot 1203, the structural member lock slot 1601, the U-shaped structural member lock slot 1505, the upper security panel lock slot 1104, the upper security panel structural member lock slot 1002, the security panel body member lock slot 701 and/or the door panel lock slot (not shown) or body member lock slot (not shown).

The pet travel door frame lock slot 1203, the structural member lock slot 1601, the U-shaped structural member lock slot 1505, the upper security panel lock slot 1104, the upper security panel structural member lock slot 1002, the security panel body member lock slot 701, and/or a door panel lock slot (not shown) or body member lock slot (not shown) may be configured to be at an angle such that when the locking arm 601 of the lock member 104 is rotatably moved to the locked position the locking arm 601 may encounter increased resistance as it is increasingly rotatably is turned, and may experience a greater amount of friction as the locking arm 601 is rotatably moved to the locked position. The angle referred to above is an angle that is off-center from an imaginary vertical plane traveling between ends of the lock slots 1505 and 1601. In other words, the locking arm 601 may be configured so that when it is rotated into the locked position, the locking arm 601 is off-center from the imaginary plane to increase resistance and provide for a stronger locked position.

Now referring back to FIGS. 1A, 1B, 9, 11, 12, 15A, and 17B, the main body member or body receiving channels 1512, the pet travel door frame through channels 1202, the seal member through channels 1103, and/or the U-shaped structural member through channels 1504 may be positioned to align with one another and the structural post members 901 and allow for the structural post members 901 to be matingly positioned within them when the security panel 502 is placed to cover the pet travel door 301.

Now referring additionally to FIG. 10, the structural post member 901 on the lower security panel structural member 1003 may be configured to comprise of an elongated flat pate and/or cylindrical poles. The main body member or body receiving channels 1512, the pet travel door frame through channels 1202, the seal member through channels 1103, and/or the U-shaped structural member through channels 1504 may be configured to comprise of a channel to accept an elongated flat plate that is used as the structural post members 901, and/or the structural post members 601 as illustratively shown in FIG. 10 as cylindrical poles.

Figure 19:
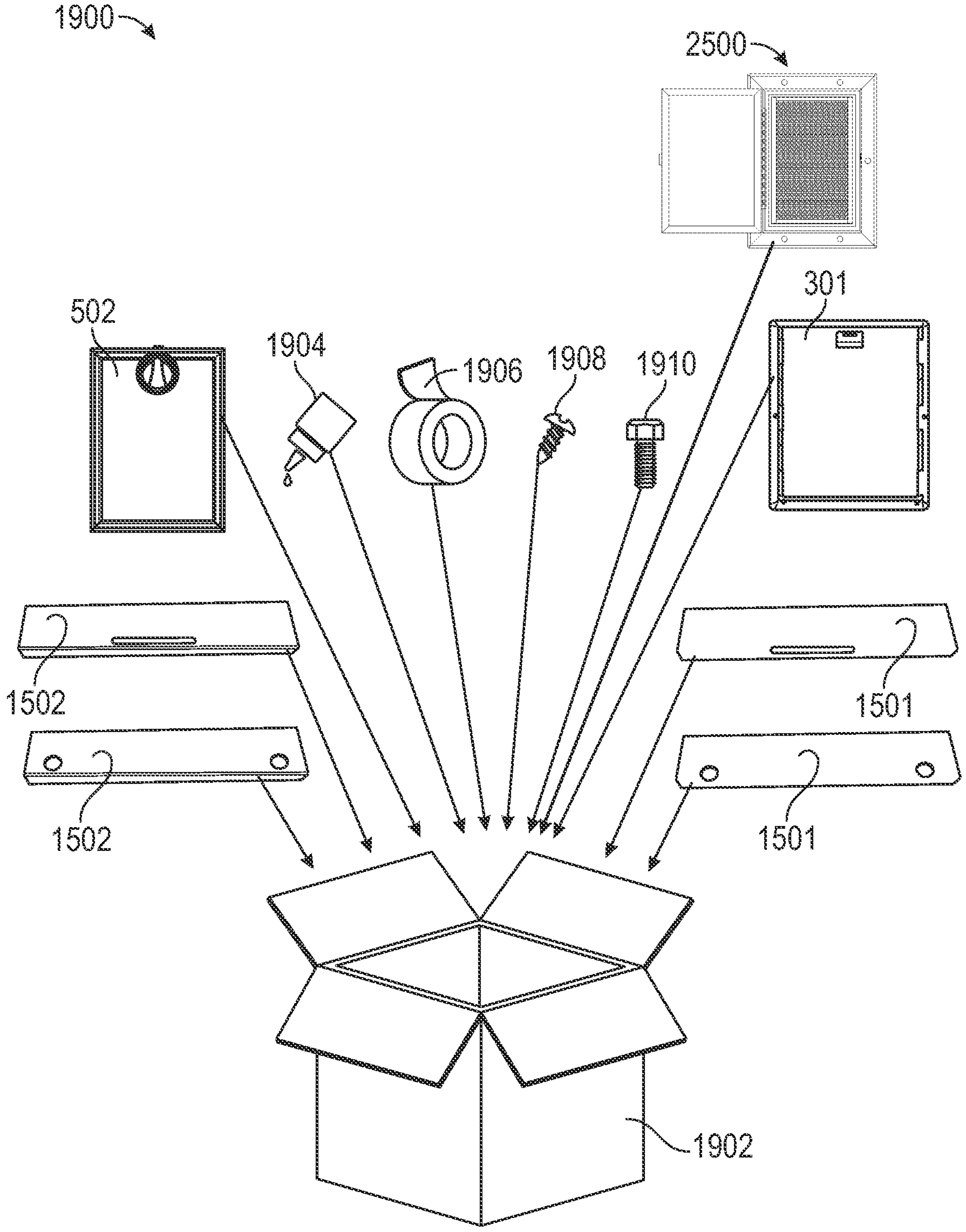
FIG. 19 depicts a kit to retrofit an existing door with a pet travel door according to embodiments of the present invention.

Referring now additionally to FIG. 19, the present invention includes a kit 1900 to retrofit an existing door 100 to include a pet travel door 301. The kit 1900 may include a container 1902, a pet travel door 301 carried by the container 1902, and a structural member 1501 carried by the container 1902. The kit 1900 may also include a U-shaped structural member 1502 carried by the container 1902 and at least one of an adhesive 1904, an adhesive double-sided tape 1906, at least one screw 1908, and at least one bolt 1910 carried by the container 1902. The pet travel door 301 is adapted to be affixed within a passageway 304 formed through a portion of the existing door 100. The pet travel door 301 is also adapted to be affixed within the passageway 304 using at least one of the adhesive 1904, the adhesive double-sided tape 1906, the at least one bolt 1910, and the at least one screw 1908.

As discussed in greater detail above, the structural member 1501 and the U-shaped structural member 1502 may have at least one through channel formed through a portion thereof. The at least one through channel may be adapted to be align with a through channel formed in the existing door 100 adjacent to at least one of the top and the bottom of the passageway 304.

The kit 1900 may also include a security panel 502 carried by the container. The security panel 502 may be configured to engage with portions of the pet travel door 301. The security panel 502 may include a security panel body member 102 having a front face and a back face and a lower security panel structural member 1003 connected to a bottom portion of the security panel body member 102 and having a pair of structural post members 901 extending outwardly therefrom. The security panel 502 may also include a lock member 104 carried by a top portion of the security panel body member 102. As described in greater detail above, the lock member 104 is rotatably moveable between a locked position and an unlocked position. The security panel 502 may also include an upper security panel structural member 1001 affixed to a top of the security panel body member 102. The upper security panel structural member 1001 has an upper security panel lock slot 1002 formed therein and positioned to align with the lock slot formed in the existing door 100.

The kit 1900 may further include a seal member 501 carried by the container 1902. The seal member 501 is adapted to be positioned adjacent an outer peripheral portion of the security panel body member 102. The seal member 501 may also have a lock slot 1104 formed therein and positioned to align with the lock slot formed in the existing door 100.

Figure 23A:
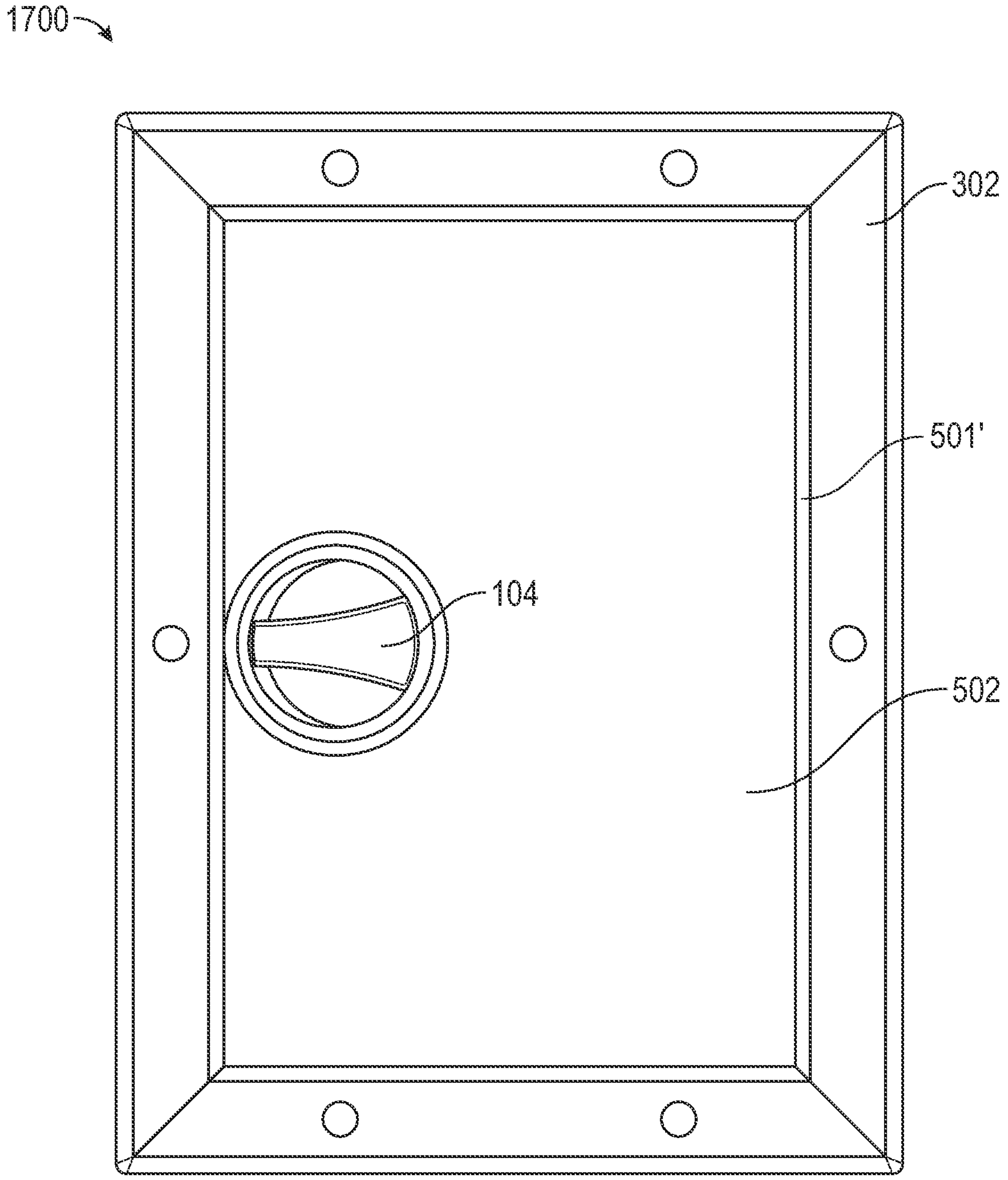
FIG. 23A is a perspective view of a hingedly connected security panel to be used in connection with the pet travel door system according to an embodiment of the present invention and in a closed position.
Figure 23B:
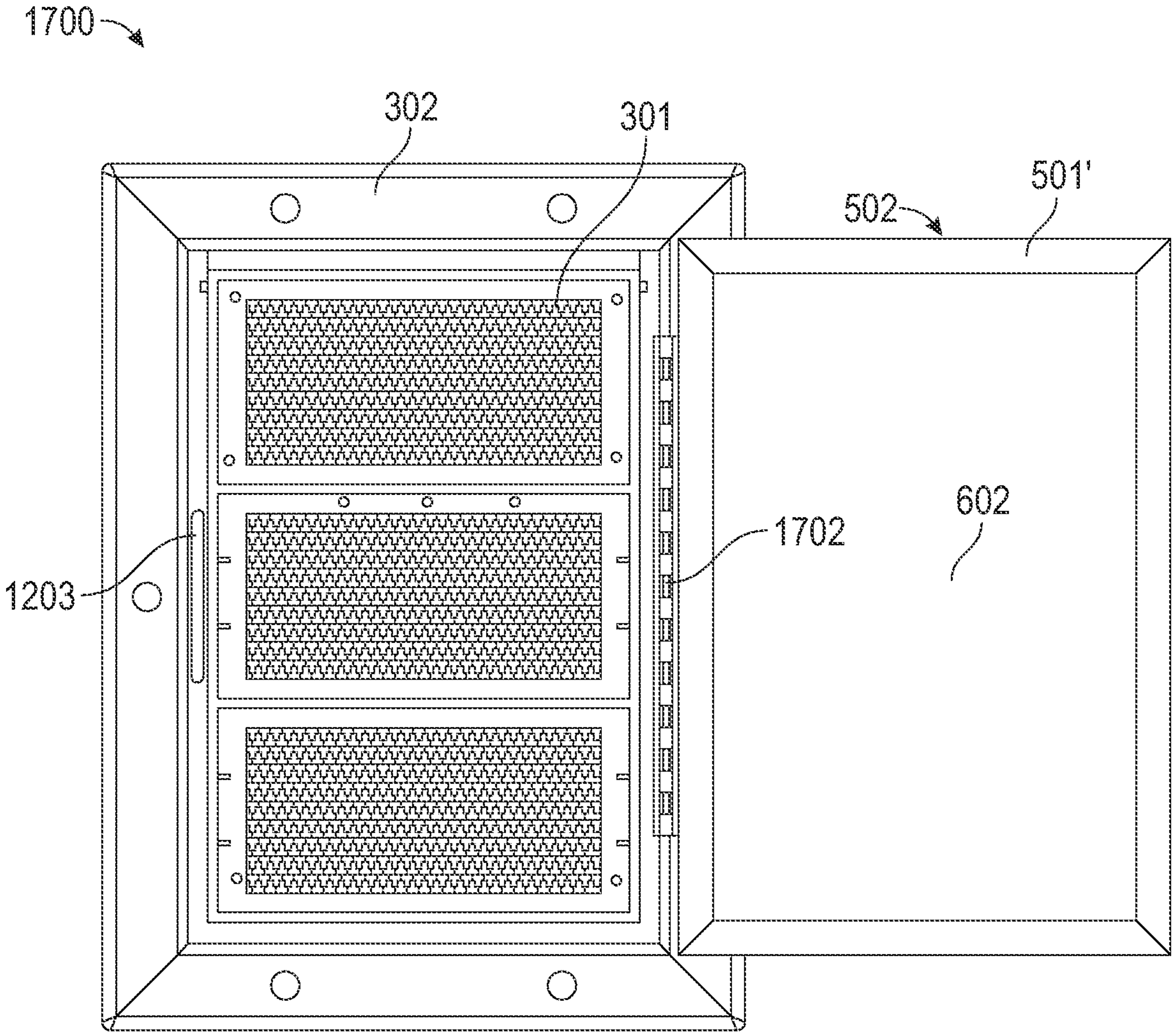
FIG. 23B is a perspective view of the security panel of FIG. 23A in an open position.
Figure 23C:
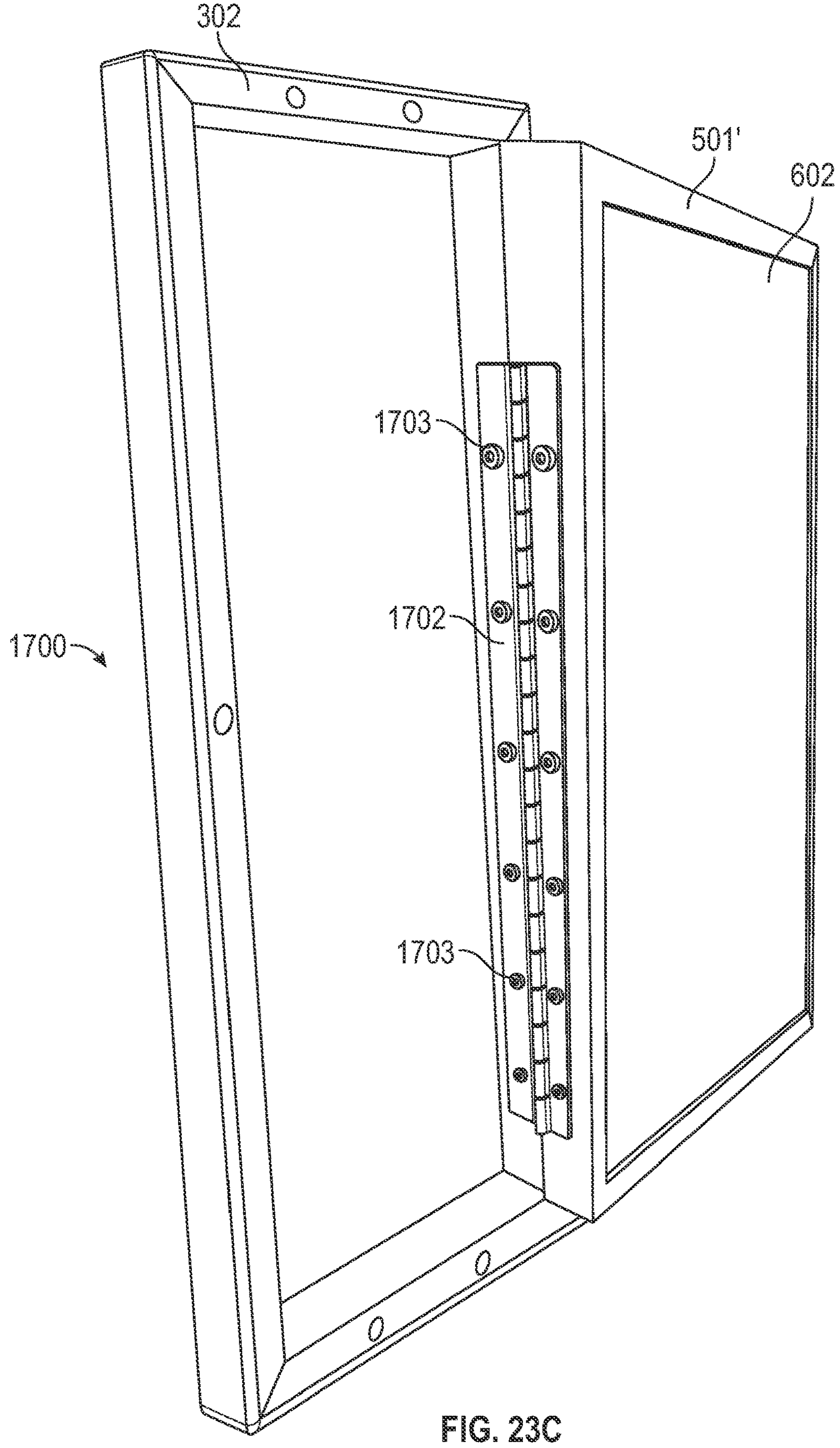
FIG. 23C is a side perspective view of the security panel illustrated in FIG. 23B.
Figure 24:
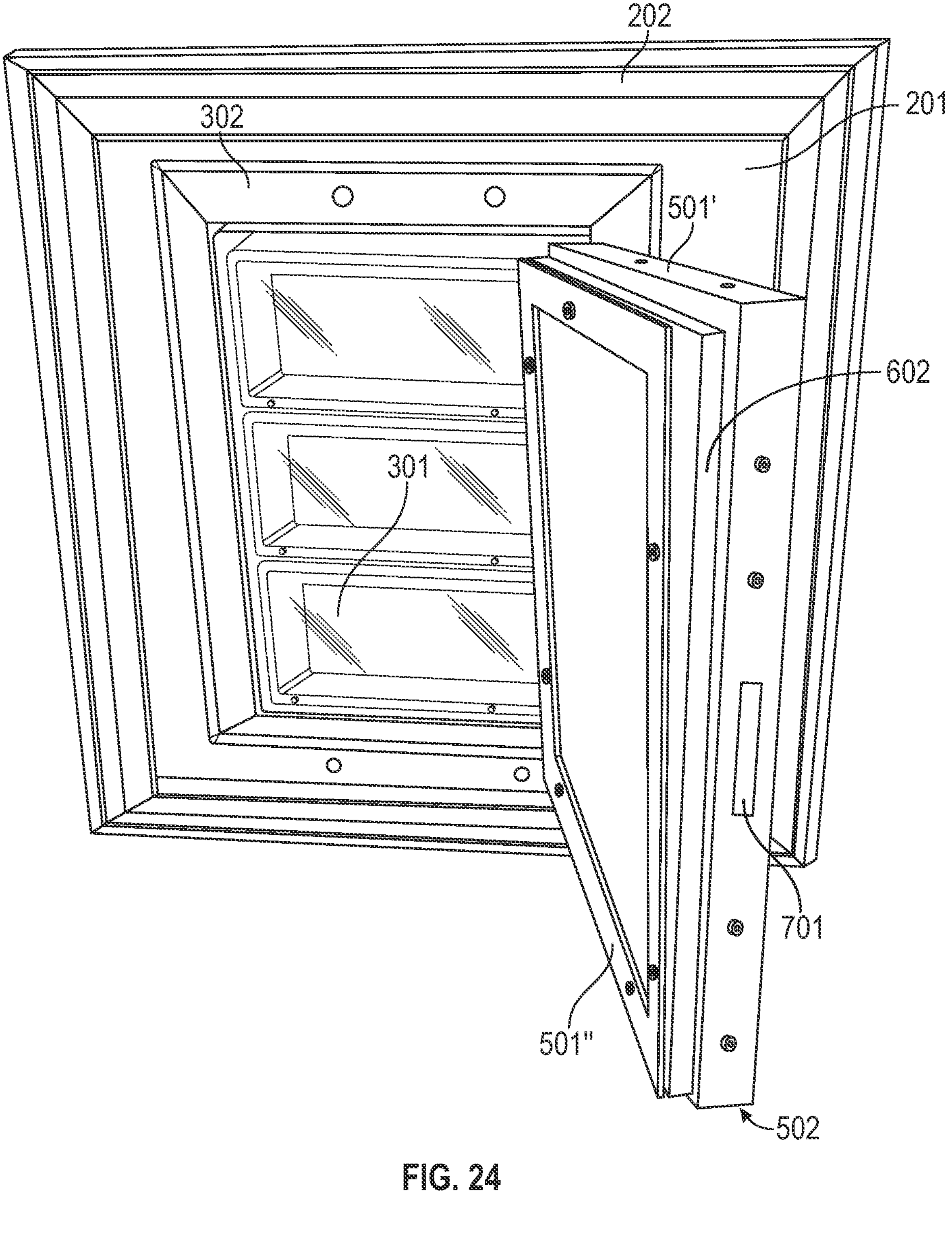
FIG. 24 is a perspective view of a hingedly connected security panel attached to a pet travel door carried by a door panel according to an embodiment of the present invention and in an open position.
Figure 25:
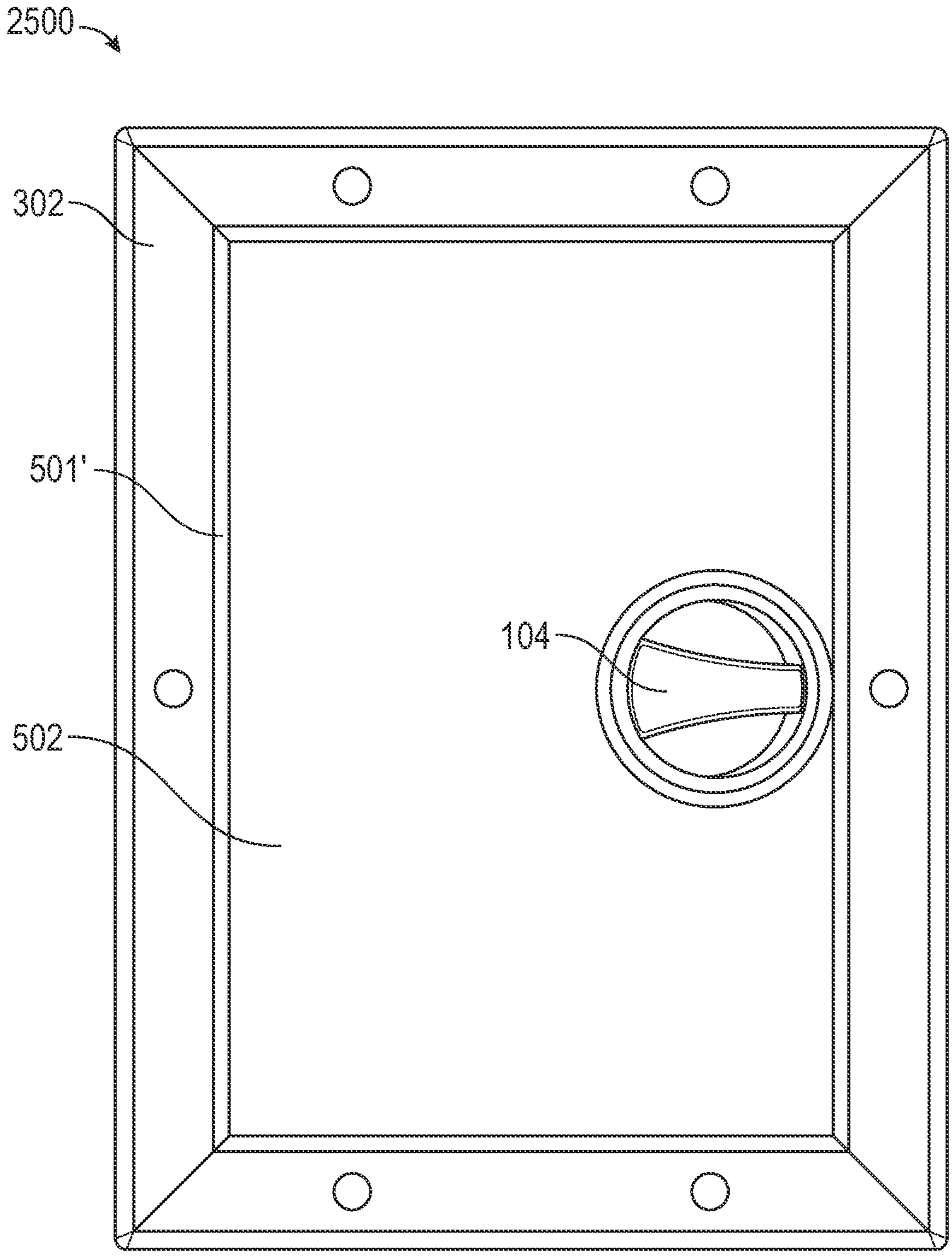
FIG. 25 is a perspective view of a hingedly connected security panel to be used in connection with the pet travel door system according to an embodiment of the present invention and in a closed position.
Figure 26:
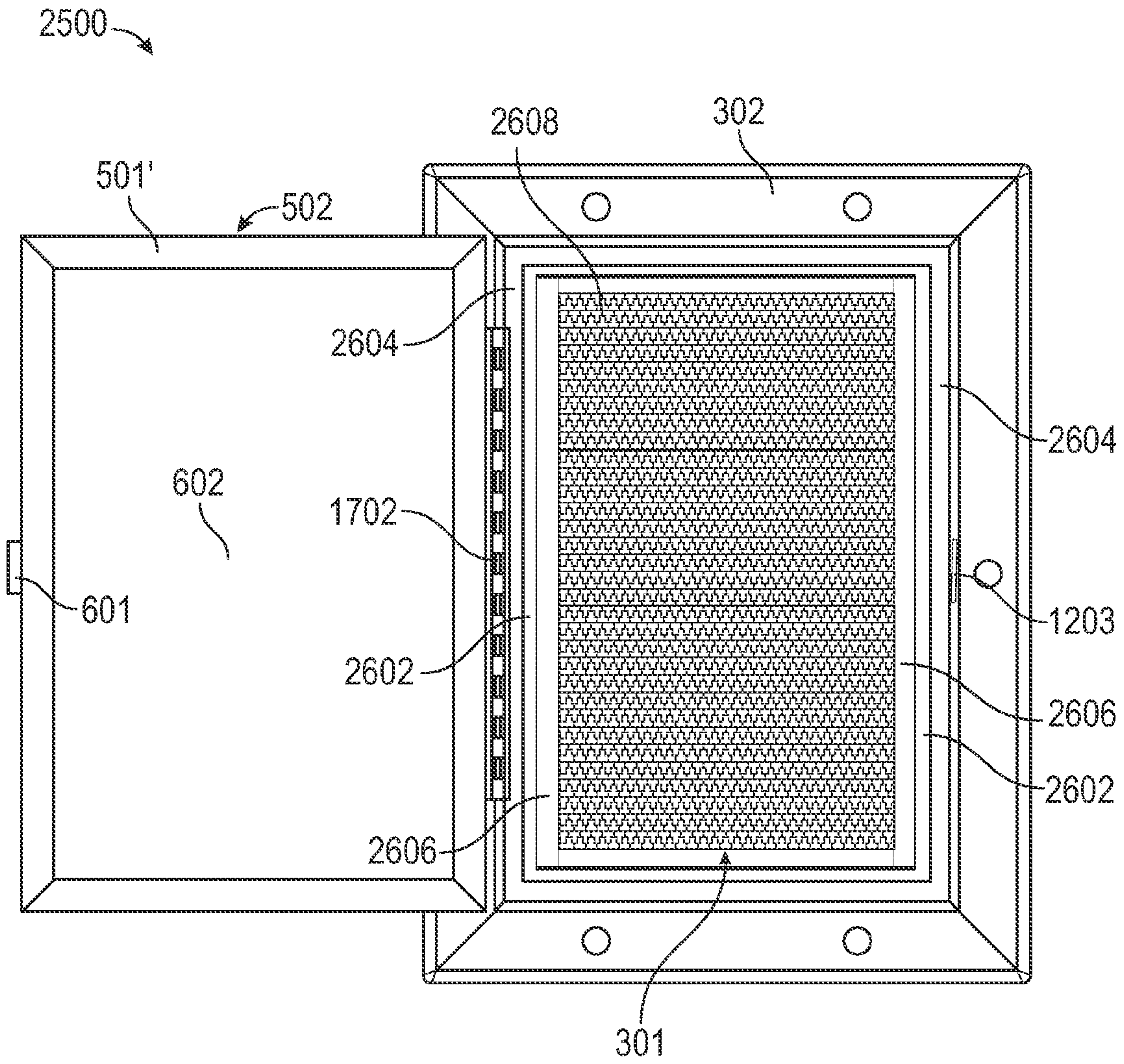
FIG. 26 is a perspective view of the security panel of FIG. 25 in an open position, and showing a flap, a pet travel door seal member, a bumper seal member, and flap reinforcement members.

Now referring to FIGS. 23A-24, an embodiment of the present invention may include the security panel 502 being hingedly attached to an inside facing portion of the pet travel door frame 302 by a hinge member 1702, defined as a hinged pet travel door system 1700. In the system 1700, the hinge member 1702 may be positioned on a right-hand side of the security panel 502, the pet travel door 301, and/or the pet travel door frame 302. Those skilled in the art will notice and appreciate that the hinge member 1702 may be positioned in a number of locations on the security panel 502, the pet travel door 301, and the pet travel door frame 302 while still accomplishing all the goals, features, and advantages of an embodiment of the present invention such as, for example, the left-hand side of the security panel 502, the pet travel door 301, and/or the pet travel door frame 302. The hinged member 1702 may be attached to the security panel 502 and the pet travel door frame 302 via rivets, screws, bolts, nails, adhesive, and/or cement. For example, rivet members 1703 are illustratively shown in FIG. 23C fixedly attaching the hinge member 1702 to the security panel 502 and to the pet travel door frame 302.

In the system 1700, the security panel 502 may be configured to be rotatably moved between an opened position and/or a closed position by use of the hinge member 1702. The opened position of the security panel 502 may be defined as when the security panel 502 is rotatably moved so that it is not covering the pet travel door 301, and the closed position of the security panel 502 may be defined as when the security panel is rotatably moved so that it is covering the pet travel door 301.

The system 1700 may include the pet travel door lock slot 1203 being positioned on an inner facing side of the pet travel door frame 302 that is opposite of the hinge member 1702, as illustratively shown in FIG. 23B. The system 1700 may further include an alternate seal member 501' that may be attached on a perimeter of the security panel 502. The security panel 502 may further include the lock member 104 being positioned on a portion of the security panel 502 that is on an opposing side from where the hinge member 1702 is attached to the security panel 502. The lock member 104 may be configured to have the same features and functionality as mentioned above and further below herein when used with a hingedly connected security panel 502. The seal member lock slot 701 may be positioned on the alternate seal member 501' on the same side of the security panel 502 as where the lock member 104 is positioned on the security panel 502 such that the seal member lock slot 701 is positioned to allow for the rotatable movement of the lock member 104 and the locking arm 601.

Now referring specifically to FIG. 24, the system 1700 configuration may also include a second alternate seal member 501" that may be attached to an inside facing side of the security panel 502. The second alternate seal member 501" may also be positioned on the security panel 502 such that the second alternate seal member 501" is overlaying the reinforcement member 602. The second alternate seal member 501" may be positioned on the security panel 502 so that it may be about the same as the perimeter of the security panel 502 and may comprise of rubbers, plastics, composites, and/or elastics either in whole or in part, and either in a homogeneous or heterogenous combination. The second alternate seal member 501" may be configured to create a seal against the pet travel door 301 and/or pet travel door frame 302 when the security panel 502 is in the closed position as illustratively shown in FIG. 23A.

Alternative embodiments of the present invention may include a system 2500 having a door 100 or door panel 201 including an integrated pet travel door 301 comprising a flap 2608, as illustratively shown in FIGS. 1A-4 and 25-26. The door 100 may include a main body member 101 having lower door panel 105 that may have a front face a back face. A passageway 304 may be formed through the lower door panel 105. The passageway 304 may be defined as having a top, a bottom, and side portioned extending between the top and bottom of the passageway 304. The integrated pet travel door 301 may include a pet travel door frame 302 that may be attached to the top, bottom, and side portions of the passageway 304. The integrated pet travel door 301 may also include a pet travel door seal 2602, a bumper seal 2604, a flap 2608, a pair of opposing flap reinforcement members 2606, and a security panel 502.

The pet travel door seal 2602 may be positioned and/or attached to the pet travel door frame 302. The pet travel door seal 2602 may be positioned on an inward perimeter of the pet travel door frame 302. The bumper seal 2604 may be positioned on and/or connected to the pet travel door seal 2602. The bumper seal 2604 may be positioned extending outwardly from the pet travel door seal 2602, which may me such that the bumper seal 2604 extends outwardly less than, further than, or the similarly as the pet travel door frame 302. The flap 2608 may be connected to a portion of the pet travel door frame 302, which may be an upper portion of the pet travel door frame 302. The flap 2608 may be sized to fit within the interior perimeter of the pet travel door 302, which may be such a sized to allow for the flap 2608 to not be constrained from moving with respect to the pet travel door frame 302. The flap 2608 and the pet travel door frame 302 may be configured to allow for the flap 2608 to pivotally move with respect to the pet travel door frame 302. The flap reinforcement members 2606 may be connected to side portions of the flap 2608. The flap reinforcement members 2606 may extend the length of the sides of the flap 2608, and may extend less than the length of the sides of the flap 2608.

The security panel 502 may be attached to a side portion of the pet travel door frame 302. The security panel 502 may be hingedly connected to the pet travel door frame 302. The security panel 502 may be sized to substantially cover an internal perimeter of the pet travel door frame 302. The security panel 502 may also be size to substantially cover the flap 2608. The security panel 502 may be moveable between a closed position and an opened position. The closed position of the security panel 502 may be defined as the security panel substantially contained within the internal perimeter of the pet travel door frame 302, which may be so that the flap 2608 and/or the passageway 304 may be covered by the security panel 502. The opened position of the security panel 502 may be defined as the security panel 502 being positioned so that the passageway 304 is at least partially exposed, and/or when the flap 2608 is at least partially exposed.

The flap 2608 may be moveable between a closed position and an opened position. the closed position of the flap 2608 may be defined as when a bottom portion of the flap 2608 is substantially aligned with a bottom portion of the pet travel door frame 302. The opened position of the flap 2608 may be defined as when the bottom portion of the flap 2608 is at least partially spaced apart from the bottom portion of the pet travel door frame 302. When the security panel 502 is in the closed position, the flap 2608 may not be moveable.

An upper portion of the flap 2608 may be pivotably attached to the pet travel door frame 302, structural member 1501, U-shaped structural member 1502, and the door panel 105, the main body member 101, and/or the body member 201 via a swing rod extending along an upper portion of the passageway 304. The flap 2608 may also include one or more magnets positioned at a lower portion of the flap 2608 that may be used to pull and/or hold the flap 2608 in the closed position by the one or more magnets coming into proximity with other positioned adjacent to a lower portion of the passageway 304.

The pet travel door seal 2606 and/or the flap 2608 may be configured so that the pet travel door seal 2606 abuts an outer perimeter of the flap 2608 when the flap 2608 is in the closed position. When the pet travel door seal 2606 is abutting the flap 2608 there may be a restriction of air or objects from passing through and/or around the flap 2608. The pet travel door seal 2606 may include one or more of felt weather stripping, reinforced those weather stripping, metal weather stripping, plastic weather stripping, foam tape weather stripping, closed cell foam weather stripping, rubber weather stripping, brush pile weather stripping, gray pile weather stripping, and wool pile weather stripping. Preferably, the pet travel door seal 2606 comprises of wool pile weather stripping.

The security panel 502 and/or the bumper seal 2604 may be configured such that when the security panel 502 is in the closed position, the bumper seal 2604 abuts against the security panel 502. When the bumper seal 2604 abuts against the security panel 502, there may be a restriction of air or objects from passing through and/or around the security panel 502 and/or the flap 2608. The bumper seal 2604 may comprise of V-strip weather stripping. As is well understood by those skilled in the art, V-strip weather stripping, also known as a "tension seal," is a strip of material that is folded to have an elongated "V" shape. The V-strip weather seal may have a flexibility allowing the "V" shape to fold along the elongated "V" shape when a force is applied perpendicular to the V-strip weather stripping. The V-strip weather stripping may also have a shape memory such that when no perpendicular force is applied to the V-strip weather stripping, the V-strip weather stripping readily returns to the elongated "V" shape. When a surface is in contact with, and applies a pressure towards the V-strip weather stripping, the V-strip weather stripping may also apply a force towards the surface to further increase the seal made by the surface against the V-strip weather stripping.

Now additionally referring to FIGS. 5-10, the security panel 502 may include a lock member 104 that may be carried by a side portion of the security panel 502. The lock member 104 may include a locking arm 601. The lock member 104 may be configured to be rotatably moveable between a locked position and an unlocked position. The locked position of the lock member 104 may be defined by a locking arm 601 of the lock member 104 being positioned to engage a lock slot 1203 formed in a portion of the lower door panel 105 that may be adjacent one of the side portions of the passageway 304. The unlocked position of the lock member 104 may be defined as the locking arm 601 being positioned to disengage the lock slot 1203. The lock member 104 may be configured to increase the pressure of the abutment of the security panel 502 against the bumper seal 2604 when the lock member is in the locked position. Specifically, the lock slot 1203 may be angled so that when the locking arm 601 of the lock member 104 is moved to the locked position, the locking arm 601 has a force exerted on it at an inwardly direction.

As mentioned further above, the lock member 104 may include a key lock 801. The key lock 801 may be used to restrict the movement of the lock member 104 when the key lock 801 is in the locked position, and the lock member 104 may be free to rotatably move when the key lock 801 is in the unlocked position. Specifically, the key lock 801 may be moveable between an unlocked position and a locked position. When the key lock 801 is in the locked position the lock member 104 may not be moveable between the locked position and the unlocked position, and when the key lock 801 is in the unlocked position the lock member 104 may not be moveable between the locked position and the unlocked position.

Continuing to refer to FIGS. 5-10 and 25-26, the security panel 502 may also include one or more post members 901 that may be positioned and/or attached to/on an outward perimeter of the security panel 502. The post members 901 may be configured to matingly engage with a respective number of receiving channels 1202, 1503, 1504, 1512 formed within/through the pet travel door frame 302, structural member 1501, U-shaped structural member 1502, and the door panel 105, the main body member 101, and/or the body member 201 when the security panel 502 is in the closed position.

Now referring to FIG. 19, an embodiment of the present invention may be directed to a kit 1900 used to retrofit an existing door to include a pet travel door system 2500. The kit 1900 may include a container 1902, such as a box, package, or crate, that may be used to carry various members and components of an embodiment of the present invention. For example, without limitation, the container 1902 may carry a pet travel door system 2500 that may include a pet travel door frame 302, a pet travel door seal 2602, a bumper seal 2604, a flap 2608, a pair of flap reinforcement members 2606, and a security panel 502. The kit 1900 may also include adhesive and/or adhesive double-sided tape.

Figure 27:
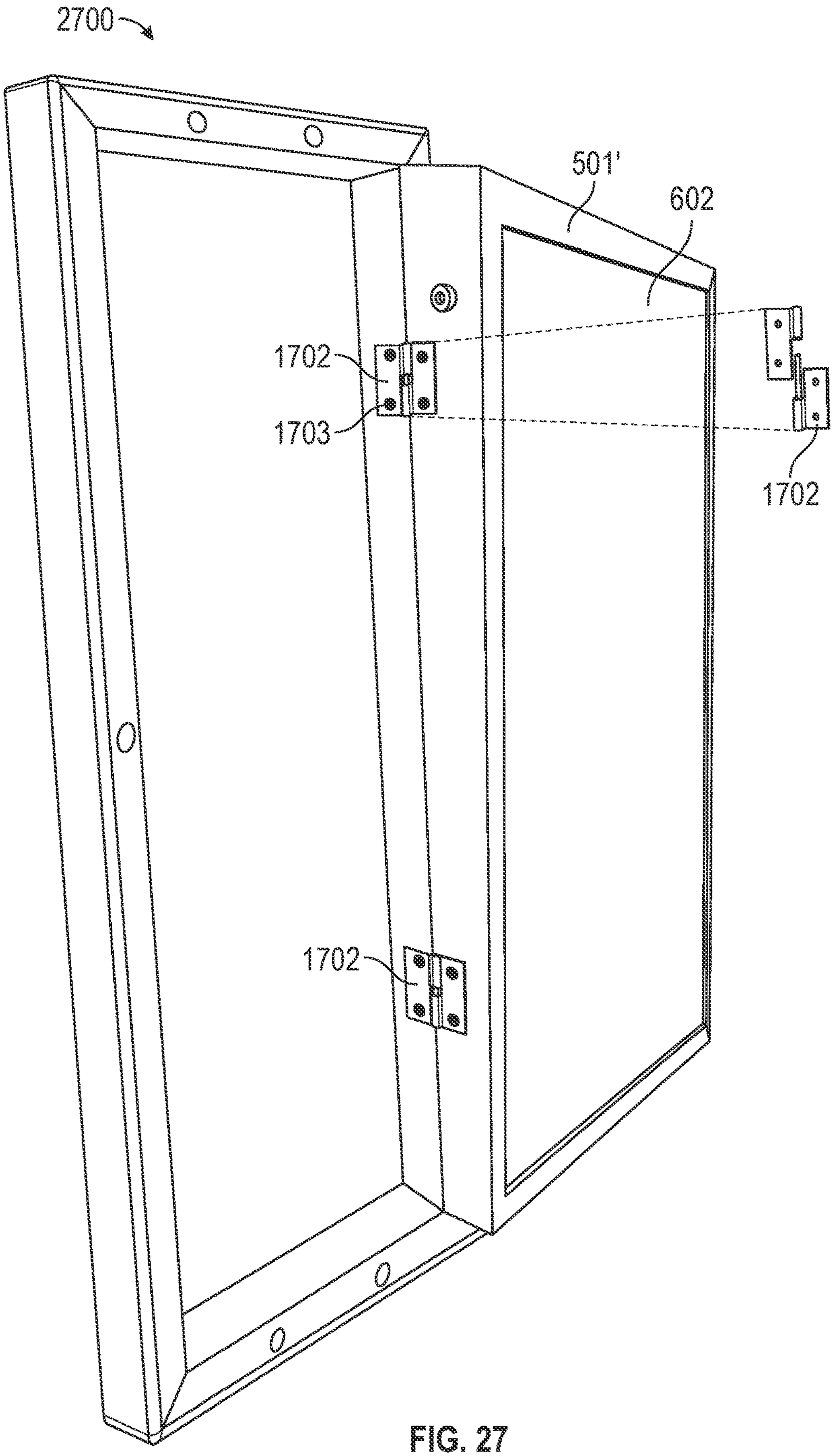
FIG. 27 is a perspective view of a hingedly connected security panel to be used in connection with the pet travel door system according to an embodiment of the present invention, showing the security panel hingedly connected with the pet travel door system via detachable hinges.

Now referring to FIG. 27, an embodiment of the present invention may include one or more hinge members 1702 that comprise detachable hinges. The detachable hinges may include lift off hinges, slip off hinges, leaf and pin hinges, flag hinges, weld-on bullet hinges, flag hinges, block hinges, barrel hinges, and any other detachable/removable hinges as understood by those skilled in the art. The detachable hinges may be configured to have two portions that may matingly engage one another to act as a hinge that may rotatably move about an axis. The detachable hinges may be configured to have the two portions of the detachable hinge to disengage one another so that the two portions of the detachable hinge are separated and not matingly engaging one another. For example, when detachable hinges comprising lift off hinges are used as the hinge member(s) 1702 to hingedly attach a security panel 502 to the pet travel door frame 302, a user may lift upwards on the security panel 502 to have the two portions of the hinge member(s) 1702 disengage one another so that the security panel 502 may be removed from its attachment to the pet travel door frame 302.

All of the above mentioned and unmentioned, members, components, and pieces of the embodiments of the present invention may be connected, affixed, and/or attached by one or more of bolts, nuts, screws, nails, adhesive, adhesive tape, adhesive double sided tape, cement, epoxy, glue, grout, tar, welding, and/or any other way of connecting/affixing/attaching the members and components of the present invention as understood by those skilled in the art. Those skilled in the art will notice and appreciate that the members and components of the present invention may be attached in a number of ways and still accomplish all the goals, features, and advantages of the present invention. Preferably, in the embodiments of the present invention any fasteners used to attach, affix, and/or connect the pieces, members, and/or components of the present invention such as, without limitation, nuts, bolts, screws, and/or nails are only accessible from an inside facing side of the present invention.

Embodiments of the present invention may also be adapted to be installed into walls, windows, glass doors, panels, and other surfaces rather than in a door 100 as described herein while still accomplishing all the goals, features, and advantages of the present invention.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A pet travel door that is installable in a surface for selectable passage of animals, the pet travel door comprising:

a pet travel door frame having an interior perimeter;

a seal connected to at least a portion of the interior perimeter of the pet travel door frame;

a flap pivotally connected to an upper portion of the interior perimeter of the pet travel door frame;

at least one security panel attachable to the pet travel door frame and selectively moveable between a closed position and an opened position;

a lock comprising a locking arm and carried by the at least one security panel; and a lock slot formed through a portion of the pet travel door frame;

wherein the lock is selectively moveable between a locked position and an unlocked position;

wherein the locked position of the lock is defined by the locking arm of the lock being engaged with the lock slot;

wherein the unlocked position of the lock is defined by the locking arm being positioned to disengage the lock slot; and wherein the lock slot is angled with respect to the pet travel door frame and angled with respect to the lock to increase a pressure of an abutment of the at least one security panel against the pat travel door frame while the at least one security panel is in the closed position and the lock is moved to the locked position.

2. The pet travel door according to claim 1, wherein the pet travel door frame includes an interior face and an exterior face, the interior face being defined as a face of the pet travel door frame that is aligned with an interior portion of a structure when the pet travel door frame is installed in an opening of a door, and the exterior face being defined as a face of the pet travel door frame that is aligned with an exterior portion of the structure when the pet travel door frame is installed in an opening of the door.

3. The pet travel door according to claim 2, wherein the flap pivots relative to the upper portion of the interior perimeter so that a lower portion of the flap is moveable between the interior portion of the structure and the exterior portion of the structure.

4. The pet travel door of claim 1, wherein an external perimeter portion of the flap includes flap reinforcement members.

5. The pet travel door of claim 1, wherein the seal comprises a bumper seal that extends outwardly from the pet travel door frame.

6. The pet travel door of claim 1, wherein the closed position of the at least one security panel is defined as the at least one security panel being substantially contained within the interior perimeter of the pet travel door frame so that the flap is covered by the security panel; and wherein the opened position of the at least one security panel is defined as the at least one security panel positioned so that the flap is at least partially exposed.

7. The pet travel door of claim 6, wherein the at least one security panel is hingedly attachable to the pet travel door frame by at least one detachable hinge that comprises two hinge portions that are selectively hingedly engageable with one another; and wherein one of the two hinge portions is attached to the pet travel door frame and the other is attached to the at least one security panel.

8. The pet travel door of claim 1, wherein the flap is moveable between an opened position and a closed position when the security panel is in the opened position, wherein the closed position of the flap is defined as a bottom portion of the flap being substantially aligned with a bottom portion of the pet travel door frame; and wherein the opened position of the flap is defined as the bottom portion of the flap being at least partially spaced apart from the bottom portion of the pet travel door frame.

9. The pet travel door of claim 8, wherein the seal abuts an outer perimeter of the flap when the flap is in the closed position.

10. The pet travel door of claim 1, wherein the pet travel door frame is integrated into a door panel; and wherein the pet travel door frame is mounted on a perimeter of a passageway formed through the door panel.

11. The pet travel door of claim 1, wherein the lock is rotatably movable between the locked position and the unlocked position.

12. The pet travel door of claim 1, wherein the lock is carried within a portion of the at least one security panel.

13. The pet travel door of claim 1, wherein the at least one security panel includes a security panel lock slot; and wherein the at least one security panel lock slot is positioned to substantially align with the lock slot when and while the at least one security panel is in the closed position.

14. The pet travel door of claim 1, further comprising a key lock connected to the lock; wherein the key lock is movable between a key lock locked position and a key lock unlocked position; wherein while the key lock is in the key lock locked position the lock is prevented from moving between the locked position and the unlocked position; and wherein while the key lock is in the key lock unlocked position the lock is movable between the locked position and the unlocked position.

* * * * *